(12) United States Patent
Yamamoto et al.

(10) Patent No.: US 9,441,806 B2
(45) Date of Patent: Sep. 13, 2016

(54) LAMP UNIT

(71) Applicant: KOITO MANUFACTURING CO., LTD., Tokyo (JP)

(72) Inventors: Teruaki Yamamoto, Shizuoka (JP); Akinori Matsumoto, Shizuoka (JP); Kiyotaka Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/651,950

(22) PCT Filed: Nov. 26, 2013

(86) PCT No.: PCT/JP2013/081723
§ 371 (c)(1),
(2) Date: Jun. 12, 2015

(87) PCT Pub. No.: WO2014/091919
PCT Pub. Date: Jun. 19, 2014

(65) Prior Publication Data
US 2015/0316225 A1 Nov. 5, 2015

(30) Foreign Application Priority Data

Dec. 13, 2012 (JP) .................................. 2012-272244
Dec. 13, 2012 (JP) .................................. 2012-272247

(51) Int. Cl.
*F21V 17/02* (2006.01)
*F21S 8/10* (2006.01)
*B60Q 1/14* (2006.01)

(52) U.S. Cl.
CPC ........ *F21S 48/1794* (2013.01); *F21S 48/1159* (2013.01); *F21S 48/125* (2013.01);

(Continued)

(58) Field of Classification Search
CPC .................... B60Q 2300/056; B60Q 2300/41; B60Q 2300/42; B60Q 2300/122; F21S 48/1794
USPC ........................................................ 362/382
See application file for complete search history.

(56) References Cited

U.S. PATENT DOCUMENTS 5,339,226 A * 8/1994 Ishikawa .................. B60Q 1/14
362/282
5,645,338 A * 7/1997 Kobayashi ............. B60Q 1/085
362/276

(Continued)

FOREIGN PATENT DOCUMENTS

| JP | 2010232081 A | 10/2010 |
|----|--------------|---------|
| JP | 2011005992 A | 1/2011 |
| JP | 2013140779 A | 7/2013 |

OTHER PUBLICATIONS

ISR (PCT/ISA/210) issued Dec. 24, 2013; in related International Application No. PCT/JP2013/081723.

(Continued)

*Primary Examiner* — Andrew Coughlin
(74) *Attorney, Agent, or Firm* — Sughrue Mion, PLLC

(57) ABSTRACT

A rotary shade is disposed behind a projection lens to block a portion of light emitted from a light source. The rotary shade has a twisted end surface to form an edge projected as a peripheral edge of a light distribution pattern which changes position in relation to the rotation of the shade. The twisted end surface is arranged so that the closer the twisted end surface is to the projection lens the more the twisted end surface approaches the optical axis. The twisted end surface moves from the front to the back of a rear focal point in relation to the rotation of the rotary shade in the direction in which the illumination area of the light distribution pattern increases.

5 Claims, 16 Drawing Sheets

(52) U.S. Cl.
CPC ............ *F21S48/1258* (2013.01); *B60Q 1/143* (2013.01); *B60Q 2300/056* (2013.01); *B60Q 2300/42* (2013.01)

(56) References Cited

U.S. PATENT DOCUMENTS

| | | | | |
|---|---|---|---|---|
| 6,116,764 | A * | 9/2000 | Eichhorn | B60Q 1/122 362/282 |
| 2009/0154187 | A1 * | 6/2009 | Kim | B60Q 1/085 362/539 |
| 2010/0033978 | A1 * | 2/2010 | Ehm | B60Q 1/085 362/465 |
| 2011/0025209 | A1 * | 2/2011 | Nakanishi | B60Q 1/12 315/82 |
| 2012/0314434 | A1 * | 12/2012 | Park | B60Q 1/143 362/465 |
| 2013/0039080 | A1 * | 2/2013 | Yamazaki | F21S 48/1784 362/465 |
| 2013/0170243 | A1 | 7/2013 | Na et al. | |

OTHER PUBLICATIONS

Written Opinion (PCT/ISA/237) issued Dec. 24, 2013; in related International Application No. PCT/JP2013/081723.

* cited by examiner

LAMP UNIT

TECHNICAL FIELD

The present invention relates to a lamp unit which is installed in a headlamp of a vehicle.

BACKGROUND ART

As this type of lamp unit, a lamp unit is known which includes a part called a rotary shade. The rotary shade is a part which has a turning axis which extends in a left-to-right direction of the vehicle, and a plurality of light blocking plates having different edge shapes are provided on the turning axis in different angular positions in relation to a circumferential direction thereof (for example, refer to Patent Literature 1).

One of the plurality of light blocking plates is brought on to an optical path which connects a light source with a projection lens as a result of the rotary shade being rotated around the turning axis. This blocks part of light which is emitted from the light source, and the edge shape of the light blocking plate is projected to the front of the vehicle through the projection lens. Then, a circumferential edge portion of a light distribution pattern which is formed ahead of the vehicle has a shape which corresponds to the edge shape of the light blocking plate. A plurality of light distribution patterns can be formed selectively by selecting the light blocking plate to be disposed on the optical path although the lamp unit uses the single light source.

As the plurality of light distribution patterns, there are known a low beam pattern which illuminates a near field ahead of the vehicle so as not to dazzle a preceding vehicle and a high beam pattern which illuminates a field expanding far ahead of the vehicle. Further, there is known a light distribution pattern in which only an area where a vehicle or a pedestrian is detected to be present ahead of the vehicle is not illuminated to be kept as a non-illuminated area in such a state that high beams are shined so that the forward visibility is ensured while restricting the dazzling of the vehicle or the pedestrian present ahead of the vehicle. In this description, this light distribution pattern will be called a "partial high beam pattern."

As described in Patent Document 1, in a left headlamp, a partial left high beam pattern is formed in which a top right-hand side portion is made into a non-illuminated area, and in a right headlamp, a partial right high beam pattern is formed in which a top left-hand side portion is made into a non-illuminated area. Then, a partial high beam pattern like the one described above can be formed by superposing those partial high beam patterns one on the other. The position and size of the non-illuminated area can be changed by executing a swivel control to swivel an optical axis of the lamp unit in the left-to-right direction.

A rotary shade is known which includes a twisted end face which extends around a turning axis so as to connect different positions in relation to the direction of the turning axis (refer to Patent Document 2, for example). The twisted end face is a portion which is projected as a boundary of a non-illuminated area which is formed partially in a high beam pattern. Since a position of the twisted end face to be projected changes in relation to the direction of the turning axis as the rotary shade turns, the position of the boundary of the non-illuminated area, that is, the position and size of the non-illuminated area can be changed without executing the swivel control.

PRIOR ART DOCUMENT

Patent Document

Patent Document 1: JP-A-2011-005992
Patent Document 2: JP-A-2010-232081

SUMMARY OF THE INVENTION

Problem that the Invention is to Solve

A circumferential surface which extends around the turning axis of the rotary shade is necessary to form the twisted end face. Forming the circumferential surface increases the solid volume portion. In the rotary shade described in Patent Document 2, the volume portion is disposed before the rear focal point of the projection lens when the partial high beam pattern is formed.

Light which is emitted from a light source and is then reflected by a reflector and the like travels towards a projection lens from various directions. Light which does not have to be blocked should ideally be all incident on the projection lens. However, as with the rotary shade described in Patent Literature 2, in case the solid volume portion exists between the incident surface of the projection lens and the rear focal point, part of light which has passed through the rear focal point is blocked or reflected by the solid volume portion, which reduces the amount of light which is incident on the projection lens. As a result of this, the desired illuminance cannot be obtained in the area illuminated by the partial high beam pattern.

Thus, a first object of the invention is to provide a technology which can restrict a reduction in illuminance at an illuminated area when a partial high beam pattern is formed by using a rotary shade.

In the rotary shade described in Patent Document 1, since the plurality of light blocking plates are disposed discontinuously on the circumferential surface thereof, the shape of the light distribution pattern changes discontinuously as the rotary shade turns. Due to this, the driver cannot avoid feeling a sensation of physical disorder.

Thus, a second object of the invention is to provide a technology which can restrict the driver from having to feel a sensation of physical disorder when the light distribution patterns are changed over by using a rotary shade.

Means for Solving the Problem

With a view to achieving the first object, according to a first mode that the invention can take, there is provided a lamp unit including:
 a light source;
 a projection lens through which at least part of light emitted from the light source passes;
 a rotary shade which is disposed behind the projection lens so as to block part of light emitted from the light source and which has a turning axis; and
 a driving mechanism which turns the rotary shade around the turning axis, wherein
 the rotary shade includes:
 a first end edge which is projected to the front of the projection lens as a circumferential edge portion of a first light distribution pattern when the driving mechanism turns the rotary shade to a first angular position;
 a second end edge which is projected to the front of the projection lens as a first circumferential edge portion of a second light distribution pattern which has a wider illumination area than that of the first light distribution pattern when the driving mechanism turns the rotary shade to a second angular position;

a third end edge which is projected to the front of the projection lens as a first circumferential edge portion of a third light distribution pattern which has a wider illumination area than that of the second light distribution pattern when the driving mechanism turns the rotary shade to a third angular position; and a first twisted end face which extends around the turning axis so as to intersect the second end edge and the third end edge in different positions in relation to the direction of the turning axis, wherein the second angular position is positioned between the first angular position and the third angular position, wherein part of the first twisted end face is projected to the front of the projection lens as a second circumferential portion of the second light distribution pattern and a second circumferential edge portion of the third light distribution pattern, wherein the first twisted end face is disposed so as to approach an optical axis of the projection lens as it approaches the projection lens, and wherein the first twisted end face moves from the front to the rear of a rear focal point of the projection lens when the driving mechanism turns the rotary shade from the first angular position to the third angular position.

According to this configuration, the twisted end face which has the portions which are projected as the circumferential edge portions of the light distribution patterns moves to the rear of the rear focal point of the projection lens as the rotary shade turns in the direction in which the illumination area increases. This restricts the reduction in the amount of light which is incident on the projection lens as a result of part of light which has passed through the rear focal point being blocked or reflected. Consequently, when forming the light distribution patterns of which a high illuminance is required, it is possible to avoid a situation in which a desired illuminance cannot be obtained.

Additionally, light emitted from the light source travels towards the projection lens from various directions. It is light which passes through the rotary shade from the rear of the rear focal point of the projection lens towards the optical axis of the projection lens that affects largely the amount of light incident on the projection lens when the light so travels. According to the configuration described above, the first twisted end face is disposed so that the first twisted end face approaches the optical axis of the projection lens as it approaches the projection lens. Consequently, there is caused no such situation that the first twisted end face obstructs the travel of light described above, thereby making it possible to restrict the reduction in the amount of light incident on the projection lens.

The rotary shade may include a second twisted end face which extends around the turning axis so as to intersect the first twisted end face and the first end edge in different positions in relation to the direction of the turning axis.

According to this configuration, it is possible to achieve a smooth change in the shape of the light distribution pattern from the first light distribution pattern to the second light distribution pattern, thereby making it possible to restrict a sensation of physical disorder that the driver has to feel.

The rotary shade may include a circumferential surface which extends concentrically with the turning axis, and part of the first end edge, part of the second end edge and the third end edge may extend parallel to the turning axis to constitute part of the circumferential surface.

According to this configuration, the position of the circumferential edge portion of the light distribution pattern which is formed sequentially by these end edges being projected does not change in association with the transition of the light distribution pattern. Consequently, the change in the shape of the light distribution pattern associated with the transition thereof is restricted to a required minimum level, thereby making it possible to restrict the driver from having to feel the sensation of physical disorder.

For example, the first light distribution pattern can be a light distribution pattern which illuminates further downwards than the circumferential edge portion. Additionally, the second light distribution pattern and the third light distribution pattern can be light distribution patterns which illuminate further downwards than the first circumferential edge portions thereof and either of the left and right of the second circumferential edge portions in an area which illuminates further upwards than the first circumferential edge portions thereof. As this occurs, the second circumferential edge portions move in the left-to-right direction when the driving mechanism turns the rotary shade from the second angular position to the third angular position.

By using a semiconductor light emitting device as the light source and a resin lens as the projection lens, the chromatic aberration can easily be dealt with.

With a view to achieving the second object, according to a second mode that the invention can take, there is provided a lamp unit including:

a light source;

a projection lens through which at least part of light emitted from the light source passes;

a rotary shade which is disposed behind the projection lens so as to block part of light emitted from the light source and which has a turning axis; and a driving mechanism which turns the rotary shade around the turning axis, wherein the rotary shade includes:

a first end edge which is projected to the front of the projection lens as a circumferential edge portion of a first light distribution pattern when the driving mechanism turns the rotary shade to a first angular position;

a second end edge which is projected to the front of the projection lens as a first circumferential edge portion of a second light distribution pattern which has a wider illumination area than that of the first light distribution pattern when the driving mechanism turns the rotary shade to a second angular position; and a twisted end face which extends around the turning axis so as to intersect the first end edge and the second end edge in different positions in relation to the direction of the turning axis, wherein part of the twisted end face is projected to the front of the projection lens as a second circumferential portion of the second light distribution pattern, and wherein a position where the twisted end face intersects the first end edge corresponds to an outer end portion of the first light distribution pattern in the left-to-right direction of the vehicle.

According to this configuration, the light distribution pattern shifts from the first light distribution pattern to the second light distribution pattern, the second circumferential edge portion of the second light distribution pattern which is formed by the twisted end face appears first at the outer end portion of the second light distribution pattern in the left-to-right direction of the vehicle. Then, the second circumferential edge portion moves to a central portion in the left-to-right direction as the rotary shade turns. Thus, the shape of the light distribution pattern changes continuously and smoothly from the first light distribution pattern to the second light distribution pattern.

The rotary shade may include a circumferential surface which extends concentrically with the turning axis between the first angular position and the second angular position. The circumferential surface may be disposed so as to correspond to the central portions of the first light distribution pattern and the second light distribution pattern in relation to the left-to-right direction of the vehicle.

According to this configuration, the position of the circumferential edge portion of the light distribution pattern which is formed sequentially by the end edge of the circumferential portion being projected does not change in association with the transition or shift of the light distribution pattern. Then, the central portion of the light distribution pattern in relation to the left-to-right direction of the vehicle is a portion which changes lastly as the rotary shade turns or a portion which does not change even though the rotary shade turns. Consequently, the change in the shape of the light distribution pattern associated with the transition thereof is restricted to a required minimum level, thereby making it possible to restrict the driver from having to feel the sensation of physical disorder.

The twisted end face may be disposed so that the twisted end face approaches the optical axis of the projection lens as it approaches the projection lens, so that the twisted end face moves from the front to the rear of a rear focal point of the projection lens when the driving mechanism turns the rotary shade from the first angular position to the second angular position.

According to this configuration, the twisted end face which has the portions which are projected as the circumferential edge portions of the light distribution patterns moves to the rear of the rear focal point of the projection lens as the rotary shade turns in the direction in which the illumination area increases. This restricts the reduction in the amount of light which is incident on the projection lens as a result of part of light which has passed through the rear focal point being blocked or reflected. Consequently, when forming the light distribution patterns of which a high illuminance is required, it is possible to avoid a situation in which a desired illuminance cannot be obtained.

Additionally, light emitted from the light source travels towards the projection lens from various directions. It is light which passes through the rotary shade from the rear of the rear focal point of the projection lens towards the optical axis of the projection lens that affects largely the amount of light incident on the projection lens when the light so travels. According to the configuration described above, the twisted end face is disposed so that the twisted end face approaches the optical axis of the projection lens as it approaches the projection lens. Consequently, there is caused no such situation that the twisted end face obstructs the travel of light described above, thereby making it possible to restrict the reduction in the amount of light incident on the projection lens.

For example, the first light distribution pattern can be a light distribution pattern which illuminates further downwards than the circumferential edge portion. Additionally, the second light distribution pattern and the third light distribution pattern can be light distribution patterns which illuminate further downwards than the first circumferential edge portions thereof and either of the left and right of the second circumferential edge portions in an area which illuminates further upwards than the first circumferential edge portions thereof. As this occurs, the second circumferential edge portions move in the left-to-right direction when the driving mechanism turns the rotary shade from the first angular position to the second angular position.

By using a semiconductor light emitting device as the light source and a resin lens as the projection lens, the chromatic aberration can easily be dealt with.

MODE FOR CARRYING OUT THE INVENTION

Hereinafter, referring to the accompanying drawings, the invention will be described in detail. In drawings used for the following description, scales will be changed as required in order to show constituent members in such sizes that they can be recognized.

Figure 1:
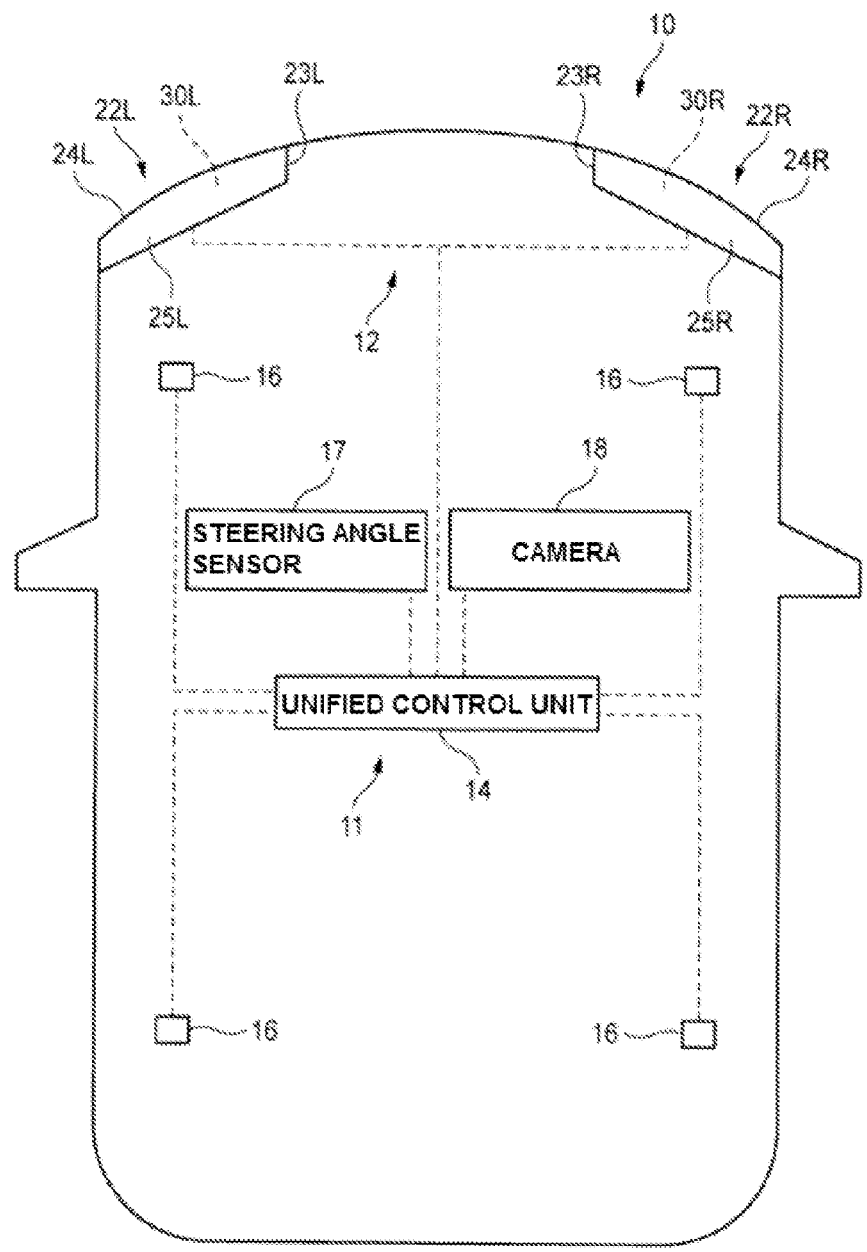
FIG. 1 is a view showing schematically an overall configuration of a vehicle on which a lamp unit according to the invention is mounted.

FIG. 1 shows schematically an overall configuration of a vehicle 10 on which a headlamp system 12 according to an embodiment of the invention is mounted. The headlamp system 12 makes up a headlamp control system 11 together with an unified control unit 14, wheel speed sensors 16, a steering angle sensor 17 and a camera 18.

The unified control unit 14 includes a CPU which executes various arithmetic operations, a ROM which stores various control programs, a RAM which is used as a working area for storing data and executing the programs and the like and executes various controls in the vehicle 10.

The wheel speed sensors 16 are provided to correspond individually to four wheels of left and right front wheels and left and right rear wheels which are assembled to the vehicle 10. The wheel speed sensors 16 are connected individually to the unified control unit 14 so as to communicate therewith and output signals corresponding to rotating speeds of the corresponding wheels to the unified control unit 14. The unified control unit 14 calculates a speed of the vehicle 10 by making use of the signals inputted from the wheel speed sensors 16.

The steering angle sensor 17 is provided on a steering wheel and is connected to the unified control unit 14 so as to communicate therewith. The steering sensor 17 outputs a signal corresponding to an angle through which the steering wheel is turned by the driver to the unified control unit 14. The unified control unit 14 calculates a traveling direction of the vehicle 10 by making use of the signal inputted from the steering angle sensor 17.

The camera 18 includes an imaging device such as a CCD (Charged Coupled Device) sensor or a CMOS (Complementary Metal Oxide Semiconductor) sensor or the like and generates image data by capturing an image ahead of the vehicle. The camera 18 is connected to the unified control unit 14 so as to communicate therewith, so that the image data generated by the camera 18 is outputted to the unified control unit 14.

The headlamp system 12 includes a right headlamp unit 22R which is disposed substantially at a front right-hand corner of the vehicle 10 and a left headlamp unit 22L which is disposed substantially at a front left-hand corner of the vehicle 10. In the right headlamp unit 22R, a light transmitting cover 24R is attached to a lamp body 23R to define a lamp compartment 25R.

Figure 2:
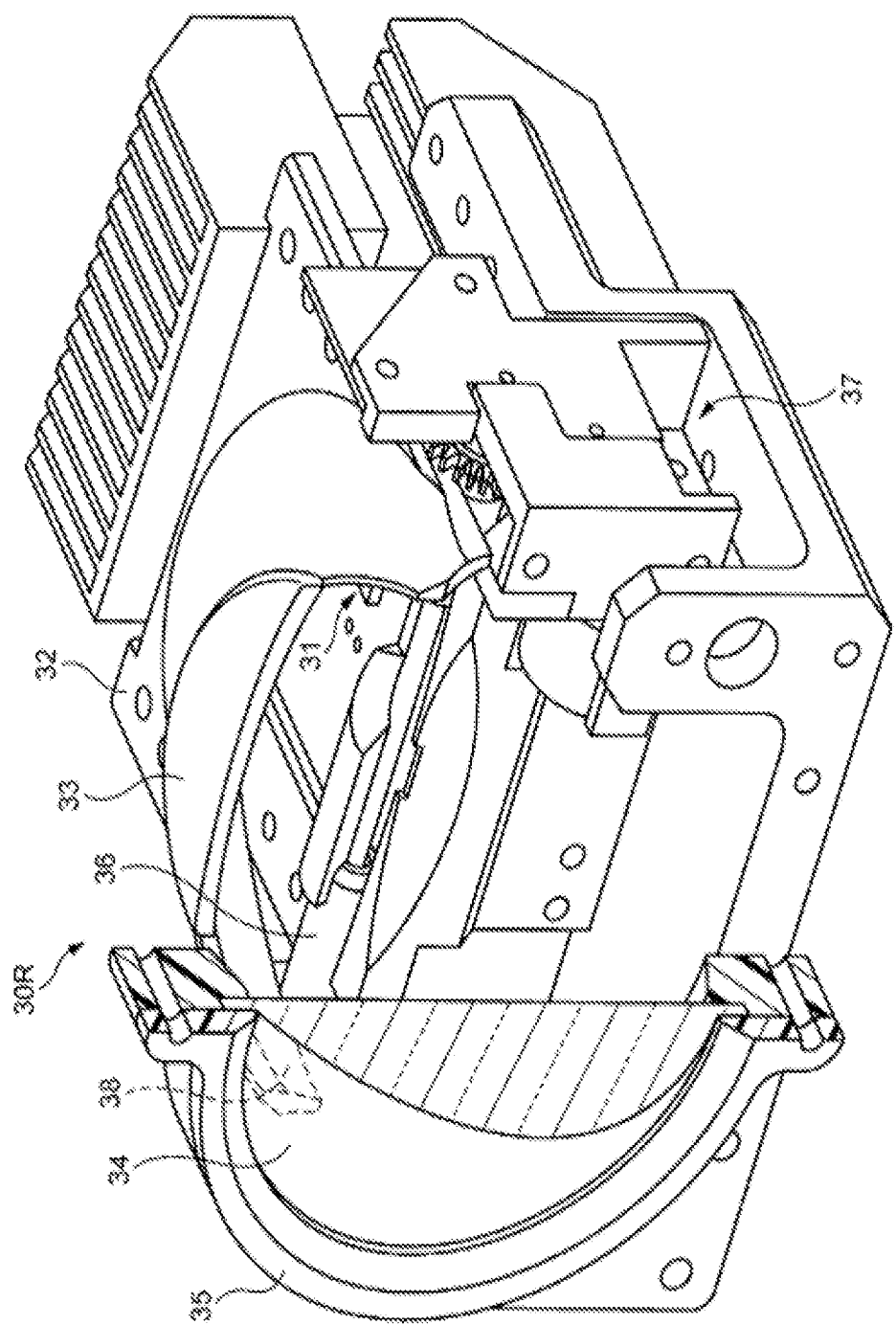
FIG. 2 is a perspective view showing the configuration of a right lamp unit according to an embodiment of the invention.

FIG. 2 is a perspective view showing the configuration of a right lamp unit 30R which is accommodated in the lamp compartment 25R of the right headlamp unit 22R. The right lamp unit 30R includes a light source 31, a heat sink 32, a reflector 33, a projection lens 34, a lens holder 35, a right rotary shade 36, a driving mechanism 37 and a supporting mechanism 38.

The light source 31 is a semiconductor light emitting device such as a white light emitting diode (LED), an organic EL device or the like. The light source 31 is fixed to the heat sink 32. The heat sink 32 is made of a known material and has a known shape, the material and shape being suitable for dissipating heat generated from the light source 31. Light emitted from the light source 31 is reflected by the reflector 33 and travels to the front. At least part of the light passes through the projection lens 34 which is disposed at the front of the reflector 33.

Figure 3A:
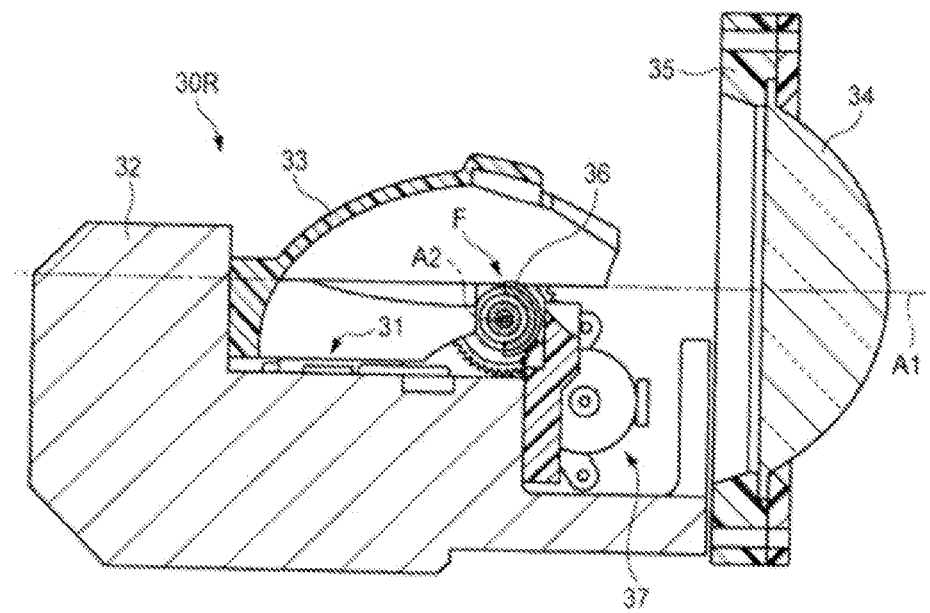
FIG. 3A is a vertical sectional view showing a positional relationship among part of the constituent elements which make up the right lamp unit.

FIG. 3A is a vertical sectional view showing a positional relationship among part of the constituent elements which make up the right lamp unit 30R. The reflector 33 has a reflecting surface which is formed based on a substantially ellipsoidal surface of which a central axis is an optical axis A1 which extends in a front-to-rear direction of the vehicle 10. The light source 31 is disposed at a first focal point of an ellipsis which makes up a vertical section of the reflecting surface. This allows light emitted from the light source 31 to converge on a second focal point of the ellipsis.

The projection lens 34 is made of a resin and is a planoconvex aspheric lens for which a front surface is convex and a rear surface is plane. The projection lens 34 is disposed so that a rear focal point F coincides with the second focal point of the reflecting surface of the reflector 33 and projects an image on the rear focal point F to the front of the vehicle 10 as a reverted image. A circumferential edge portion of the projection lens 34 is held by the lens holder 35 and is fixed to the heat sink 32.

Figure 3B:
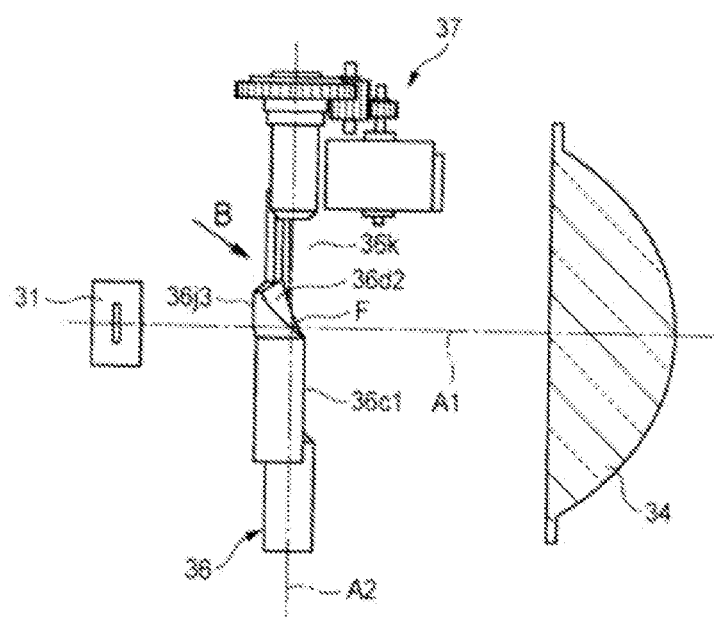
FIG. 3B is a plan view showing a positional relationship amount part of the elements which make up the right lamp unit.

FIG. 3B is a plan view showing a positional relationship amount part of the elements which make up the right lamp unit 30R. The right rotary shade 36 is disposed behind the projection lens 34 so as to block part of light emitted from the light source 31. The right rotary shade 36 has a turning axis A2 and is disposed so that the turning axis A2 passes below the rear focal point F of the projection lens 34.

The driving mechanism 37 has a motor and a gear mechanism and turns the right rotary shade 36 around the turning axis A2. Specifically, the motor and the gear mechanism are driven in response to a control signal which is inputted from the unified control unit 14 of the vehicle 10, whereby the right rotary shade 36 is turned through an angle and in a direction according to the control signal.

The driving mechanism 37 is fixed to a left axial end portion of the right rotary shade 36, and the supporting mechanism 38 supports a right axial end portion of the right rotary shade 36 so as to turn. Here, "right" and "left" denote such directions resulting from being viewed from the driver's seat.

Figure 4:
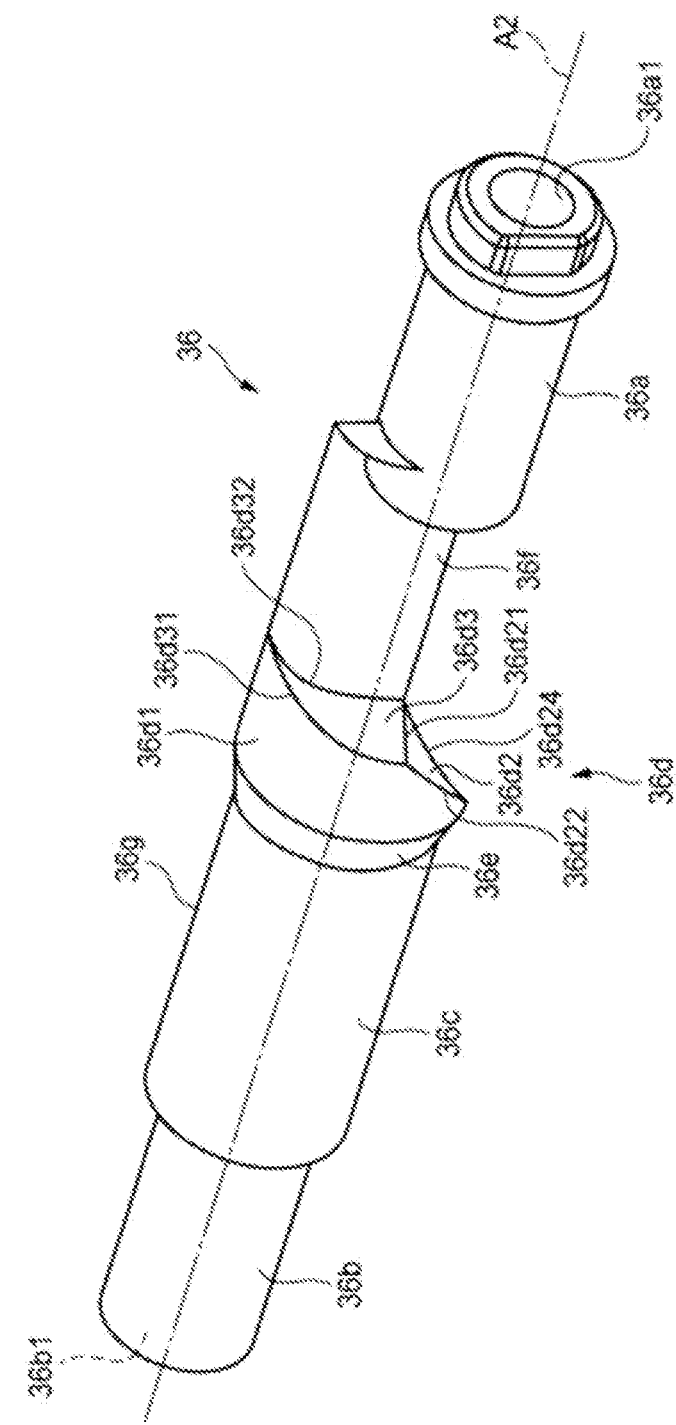
FIG. 4 is a perspective view showing an external appearance of a right rotary shade which the right lamp unit includes.

FIG. 4 is a perspective view showing an external appearance of the right rotary shade 36. As will be described in detail later by reference to FIGS. 5 and 6, the right rotary shade 36 is shaped to have circumferential surfaces and end faces which enable differently shaped end edges to be disposed at the rear focal point F of the projection lens 34 according to a rotational angle through which the right rotary shade 36 is driven by the driving mechanism 37.

Light emitted from the light source 31 is reflected by the reflector 33 to travel to the front. Part of the light is blocked by the right rotary shade 36. As this occurs, the shape of an end edge of the right rotary shade 36 which is disposed at the rear focal point F of the projection lens 34 is projected as a circumferential edge portion of a light distribution pattern which is formed ahead of the vehicle 10.

As shown in FIG. 4, the right rotary shade 36 includes a left cylindrical portion 36a, a right cylindrical portion 36b, a first connecting portion 36c, a second connecting portion 36d, a third connecting portion 36e, and a fourth connecting portion 36f.

The left cylindrical portion 36a has a cross section which looks like a concentric circle which is centered at the turning axis A2 when seen from a direction following the turning axis A2. An axial hole 36a1 is formed in the left cylindrical portion 36a and this axial hole 36a1 is coaxial with the turning axis A2. The axial hole 36a1 is connected with the driving mechanism 37.

The right cylindrical portion 36b has a cross section which looks like a concentric circle which is centered at the turning axis A2 when seen from the direction following the turning axis A2. An axial hole 36b1 is formed in the right cylindrical portion 36b and this axial hole 36b1 is coaxial with the turning axis A2. The axial hole 36b1 is supported by the supporting mechanism 38.

The first connecting portion 36c is a portion which is formed continuously to the right cylindrical portion 36b and is disposed at a right-hand side of the right cylindrical portion 36b when seen from the front of the vehicle 10. The first connecting portion 36c has a cross section which looks like a concentric semi-circle which is centered at the turning axis A2 when seen from the direction following the turning axis A2. A radius of the concentric semi-circle is greater than a radius of the concentric circle which forms the cross section of the right cylindrical portion 36b.

The second connecting portion 36d is a portion which is disposed at a right-hand side of the first connecting portion 36c when seen from the front of the vehicle 10 and has a cylindrical portion 36d1, a first twisted end face 36d2 and a second twisted end face 36d3. The cylindrical portion 36d1 has a cross section which is formed based on a concentric semi-circle which is centered at the turning axis A2 when seen from the direction following the turning axis A2 and which exhibits a shape which is partially cut away by the first twisted end face 36*d*2 and the second twisted end face 36*d*3. A radius of the concentric semi-circle is greater than the radius of the concentric circle which forms the cross section of the first connecting portion 36*c*.

The third connecting portion 36*e* is a portion which is formed continuously to the first connecting portion 36*c* and the cylindrical portion 36*d*1 of the second connecting portion 36*d* to connect them together. Namely, the third connecting portion 36*e* is a surface which extends around the turning axis A2 so as to connect a semi-cylindrical circumferential surface which is formed by the first connecting portion 36*c* with a circumferential surface which is formed by the cylindrical portion 36*d*1 of the second connecting portion 36*d* and which is inclined along the direction of the turning axis A2. Also, as shown in FIG. 3B, a boundary between the second connecting portion 36*d* and the third connecting portion 36*e* is disposed so as to pass through the rear focal point F of the projection lens 34.

The fourth connecting portion 36*f* is a portion which is formed continuously to the left cylindrical portion 36*a* and the second twisted end face 36*d*3 of the second connecting portion 36*d* to connect them together. The shapes of the first twisted end face 36*d*2, the second twisted end face 36*de* and the fourth connecting portion 36*f* will be described in detail later by reference to FIGS. 5 and 6, too.

Figure 5A:
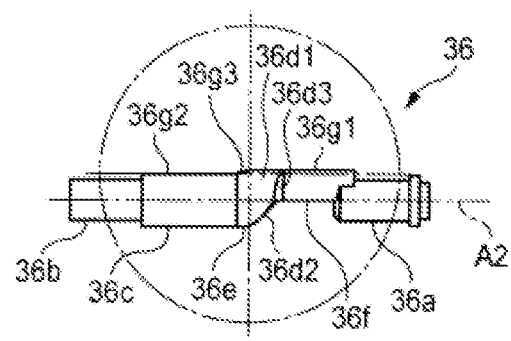
FIGS. 5A to 5D show views depicting relationships between rotational angular positions of the right rotary shade and light distribution patterns to be formed.

Respective portions of circumferential surfaces which are formed by the first connecting portion 36*c*, the second connecting portion 36*d*, the third connecting portion 36*e* and the fourth connecting portion 36*f* are chamfered to form a flat end edge portion 36*g* which extends in a direction parallel to the turning axis A2. FIG. 5A shows a state in which the right rotary shade 36 is seen from the front of the vehicle 10 which is turned by the driving mechanism 37 to an angular position where the end edge portion 36*g* is disposed at the rear focal point F of the projection lens 34.

As this occurs, the end edge portion 36*g* includes a first horizontal portion 36*g*1, a second horizontal portion 36*g*2 and an inclined portion 36*g*3. The first horizontal portion 36*g*1 is a portion which is disposed further rightwards than the optical axis A1 of the projection lens 34 to extend in a horizontal direction when seen from the front of the vehicle 10 and which is formed by the second connecting portion 36*d* and the fourth connecting portion 36*f*. The second horizontal portion 36*g*2 is a portion which is disposed further leftwards than the optical axis A1 of the projection lens 34 to extend in the horizontal direction when seen from the front of the vehicle 10 and which is formed by the first connecting portion 36*c*. The inclined portion 36*g*3 is a portion which extends obliquely downwards in an inclined fashion from the first horizontal portion 36*g*1 to the second horizontal portion 36*g*2 and which is formed by the third connecting portion 36*e*.

Figure 5B:
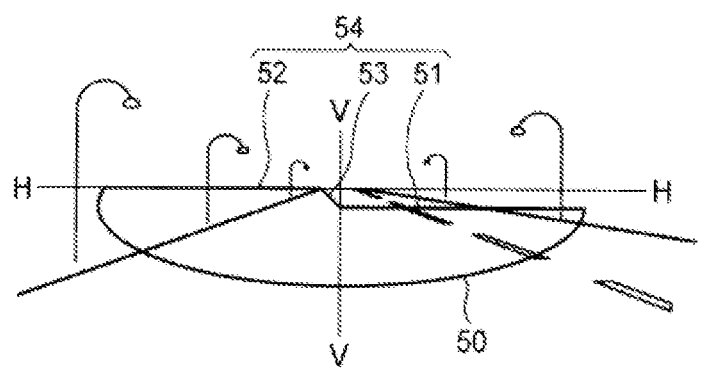

FIG. 5B is a view showing a light distribution pattern which is formed as a result of the end edge portion 36*g* being projected on to an imaginary vertical screen which is disposed ahead of the vehicle 10. This light distribution pattern corresponds to a right low beam pattern 50 (an example of a first light distribution pattern).

The right low beam pattern 50 has a first horizontal cut-off line 51, a second horizontal cut-off line 52, and an inclined cut-off line 53 on an upper end edge thereof. In the following description, the first horizontal cut-off line 51, the second cut-off line 52 and the inclined cut-off line 53 will generally be referred to as a "right lateral cut-off line 54" as required.

The first horizontal cut-off line 51 is formed by the first horizontal portion 36*g*1 of the end edge portion 36*g* and extends horizontally slightly below a horizontal line H-H, being used as an on-coming vehicle's lane side cut-off line. The second horizontal cut-off line 52 is formed by the second horizontal portion 36*g*2 of the end edge portion 36*g* and extends along the horizontal line H-H, being used as a subject vehicle's lane side cut-off line. The inclined cut-off line 53 is formed by the inclined portion 36*g*3 of the end edge portion 36*g* and extends obliquely upwards towards the left from a left end of the first horizontal cut-off line 51 to connect to a right end of the second horizontal cut-off line 52.

Namely, when the driving mechanism 37 turns the right rotary shade 36 to a position (an example of a first angular position) shown in FIG. 5A, the end edge portion 36*g* (an example of a first end edge) is projected to the front of the projection lens 34 as the right lateral cut-off line 54 (an example of a circumferential edge portion of the first light distribution pattern). Light passing above the end edge portion 36*g* illuminates below the right lateral cut-off line 54 as the right low beam pattern 50.

Figure 5C:
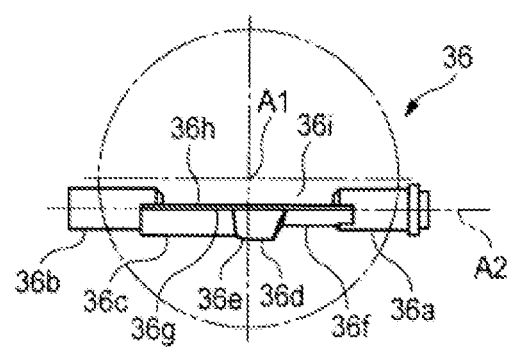
Figure 5D:
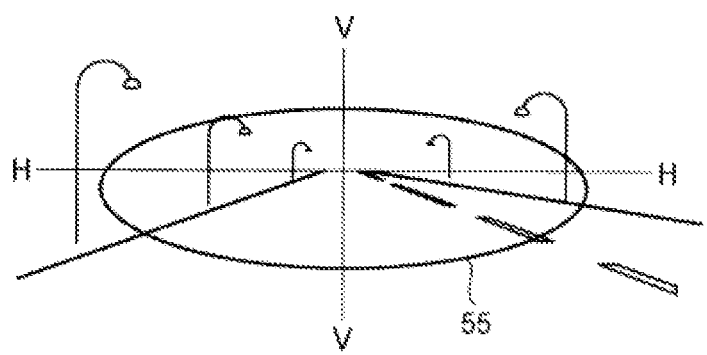

FIG. 5C shows a state in which the right rotary shade 36 which is turned through about 90 degrees towards the front of the vehicle 10 from the state shown in FIG. 5A is seen from the front of the vehicle 10. Respective portions of the first connecting portion 36*c*, the second connecting portion 36*d*, the third connecting portion 36*e* and the fourth connecting portion 36*f* form a flat surface 36*h* which continues along the turning axis A2. The flat surface 36*h* defines a space 36*i* between the left cylindrical portion 36*a* and the right cylindrical portion 36*b*.

The space 36*i* opens a space which includes the optical axis A1 of the projection lens 34. Because of this, light emitted from the light source 31 and reflected by the reflector 33 passes through the space 36*i* and the projection lens 34 without being blocked and forms a right high beam pattern 55 shown in FIG. 5D ahead of the vehicle 10. The right high beam pattern 55 is a light distribution pattern which illuminates over a wide range to a far field ahead of the vehicle 10.

Figure 6A:
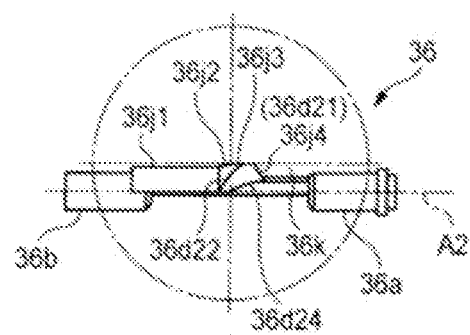
FIGS. 6A to 6F show views depicting relationships between rotational angular positions of the right rotary shade and light distribution patterns to be formed.
Figure 6B:
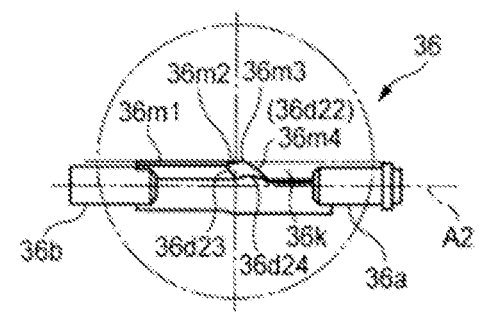
Figure 6C:
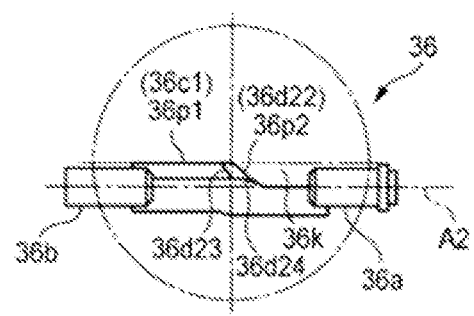

FIG. 6A shows a state in which the right rotary shade 36 which is turned through 90 degrees towards the rear of the vehicle 10 from the state shown in FIG. 5A is seen from the front of the vehicle 10. FIG. 6B and FIG. 6C show states in which the right rotary shade 36 which is turned further towards the rear of the vehicle 10 from the state shown in FIG. 6A is seen from the front of the vehicle 10.

As shown in FIG. 6A to FIG. 6C, the first twisted end face 36*d*2 is an end face which is defined by a first end edge portion 36*d*21, a second end edge portion 36*d*22, a third end edge portion 36*d*23, and a fourth end edge portion 36*d*24.

The first end edge portion 36*d*21 is a straight end edge which intersects the cylindrical portion 36*d*1 of the second connecting portion 36*d* and the fourth connecting portion 36*f* and which defines a boundary between the second twisted end face 36*d*3 and the first twisted end face 36*d*2.

As is clear from FIG. 6A to FIG. 6C, the first twisted end face 36*d*2 crosses not only the cylindrical portion 36*d*1 of the second connecting portion 36*d* but also a position corresponding to the optical axis A1 of the projection lens 34 and extends in such a way as to cut out portions of the third connecting portion 36*e* and the first connecting portion 36*c*. The second end edge portion 36*d*22 is a curvilinear end edge which approaches the right cylindrical portion 36*b* while intersecting sequentially circumferential surfaces of the cylindrical portion 36*d*1 the third connecting portion 36*e* and the first connecting portion 36*c*.

The third end edge portion 36d23 is a linear end edge which defines a boundary between the first twisted end face 36d2 and the flat surface 36h. The second end edge portion 36d22 and the third end edge portion 36d23 intersect an end edge portion 36c1 where a circumferential surface of the first connecting portion 36c and the flat surface 36h intersect. The fourth end edge portion 36d24 is a curvilinear end edge which connects the first end edge portion 36d21 and the third end edge portion 36d23 together.

The second twisted end edge 36d3 is an end face which is defined by the first end edge portion 36d31, the second end edge portion 36d32 and the first end edge portion 36d21 of the first twisted end face 36d2.

The first end edge portion 36d31 is a curvilinear end edge which defines a boundary between the second connecting portion 36d and the fourth connecting portion 36f in a position where it intersects the end edge portion 36g. The first end edge portion 36d31 approaches the third connecting portion 36e while intersecting the circumferential surface of the cylindrical portion 36d1 and extends to a position where it intersects the first end edge portion 36d21 of the first twisted end face 36d2. The first end edge portion 36d31 extends in this way to thereby define a boundary between the cylindrical portion 36d1 and the second twisted end face 36d3.

The second end edge portion 36d32 is a curvilinear end edge. The second end edge portion 36d32 defines a boundary between the second connecting portion 36d and the fourth connecting portion 36f together with the first end edge portion 36d31 in a position where it intersects the end edge portion 36g. The second end edge portion 36d32 extends to a position where it intersects the first end edge portion 36d21 of the first twisted end face 36d2 while intersecting the circumferential surface of the fourth connecting portion 36f. This defines a boundary between the fourth connecting portion 36f and the second twisted end face 36d3.

Additionally, in this embodiment, a position where the first end edge portion 36d31 of the second twisted end face 36d3 intersects the end edge portion 36g (an example of first end edge) is determined so as to correspond to a right end portion of the right low beam pattern 50 (the example of the first light distribution pattern).

In a state shown in FIG. 6A, a first horizontal end edge portion 36j1, a first inclined end edge portion 36j2, a second horizontal end edge portion 36j3 and a second inclined end edge portion 36j4 appear at an upper end portion of the right rotary shade 36.

The first horizontal end edge portion 36j1 is a portion which is disposed further leftwards than the optical axis A1 of the projection lens 34 to extend in the horizontal direction when seen from the front of the vehicle 10. The first horizontal end edge portion 36j1 is the portion which is formed by the circumferential surface of the first connecting portion 36c. The second horizontal end edge portion 36j3 is a portion which is disposed further rightwards than the optical axis A1 of the projection lens 34 to extend in the horizontal direction when seen from the front of the vehicle 10. The second horizontal end edge portion 36j3 is the portion which is formed by the cylindrical portion 36d1 of the second connecting portion 36d.

The first inclined end edge portion 36j2 is a portion which is disposed further leftwards than the optical axis A1 of the projection lens 34 to extend obliquely upwards in an inclined fashion from the first horizontal end edge portion 36j1 to the second horizontal end edge portion 36j3 when seen from the front of the vehicle 10. The first inclined end edge portion 36j2 is the portion which is formed by a circumferential surface of the third connecting portion 36e. The second inclined end edge portion 36j4 is disposed further rightwards than the optical axis A1 of the projection lens 34 to extend obliquely downwards in an inclined fashion from the second horizontal end edge portion 36j3 to the fourth connecting portion 36f. The second inclined end edge portion 36j4 is a portion which is formed by the first end edge portion 36d21 of the first twisted end face 36d2.

Figure 6D:
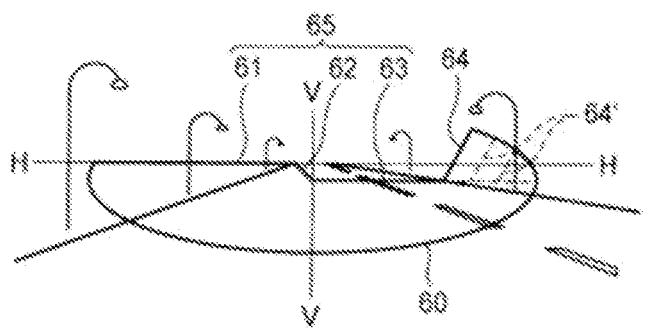

FIG. 6D is a view showing a light distribution pattern which is formed by projecting the first horizontal end edge portion 36j1, the first inclined end edge portion 36j2, the second horizontal end edge portion 36j3 and the second inclined end edge portion 36j4 on to the imaginary vertical screen disposed ahead of the vehicle 10. This light distribution pattern corresponds to a first partial right high beam pattern 60 (an example of a second light distribution pattern) and has an illumination area which is wider than that of the right low beam pattern 50.

The first partial right high beam pattern 60 has a first horizontal cut-off line 61, a first inclined cut-off line 62, a second horizontal cut-off line 63 and a second inclined cut-off line 64. In the following description, the first horizontal cut-off line 61, the first inclined cut-off line 62, and the second horizontal cut-off line 63 will be generally referred to as a "right lateral cut-off line 65".

The first horizontal cut-off line 61 is formed by the first horizontal end edge portion 36j1 and extends along the horizontal line H-H, being used as a subject vehicle's lane side cut-off line. The second horizontal cut-off line 63 is formed by the second horizontal end edge portion 36j3 and extends horizontally slight below the horizontal line H-H, being used as an on-coming vehicle's lane side cut-off line.

The first inclined cut-off line 62 is formed by the first inclined end edge portion 36j2 and extends obliquely downwards towards the right from a right end of the first horizontal cut-off line 61 to connect to a left end of the second horizontal cut-off line 63. The second inclined cut-off line 64 is formed by the second inclined end edge portion 36j4 (the first end edge portion 36d21 of the first twisted end face 36d2) and extends obliquely upwards towards the right from a right end of the second horizontal cut-off line 63.

As shown in FIG. 6A, a space 36k through which light can pass is formed on a right-hand side of the second inclined end edge portion 36j4 when seen from the front of the vehicle 10. Light which has passed through the space 36k illuminates an area lying on a right-hand side of the second inclined cut-off line 64.

Namely, when the driving mechanism 37 turns the right rotary shade 36 to a position (an example of a second angular position) shown in FIG. 6A, the first horizontal end edge portion 36j1, the first inclined end edge portion 36j2 and the second horizontal end edge portion 36j3 (an example of a second end edge) are projected to the front of the projection lens 34 as the right lateral cut-off line 65 (an example of a first circumferential edge portion of the second light distribution pattern). Additionally, the first end edge portion 36d21, which is part of the first twisted end face 36d2, is projected to the front of the projection lens 34 as the second inclined cut-off line 64 (an example of a second circumferential portion of the second light distribution pattern). Light which passes above the right rotary shade 36 and through the space 36k illuminates below the right lateral cut-off line 65 and an area above the right lateral cut-off line 65, specifically, an area lying on a right-hand side of the second inclined cut-off line 64 as the first partial right high beam pattern 60.

FIG. 6C shows a state in which the right rotary shade 36 which is turned through 90 degrees towards the rear of the vehicle 10 from the state shown in FIG. 6A is seen from the front of the vehicle 10. As this occurs, a horizontal end edge portion 36p1 and an inclined end edge portion 36p2 appear at the upper end portion of the right rotary shade 36.

The horizontal end edge portion 36p1 is disposed further leftwards than the optical axis A1 of the projection lens 34 to extend horizontally when seen from the front of the vehicle 10. The horizontal end edge portion 36p1 is a portion which is formed by the end edge portion 36c1 of the first connecting portion 36c. The inclined end edge portion 36p2 is disposed further rightwards than the optical axis A1 of the projection lens 34 to extend obliquely downwards in an inclined fashion from the horizontal end edge portion 36p1 towards the fourth connecting portion 36f. The inclined end edge portion 36p2 is a portion which is formed by the second end edge portion 36d22 of the first twisted end face 36d2.

Figure 6E:
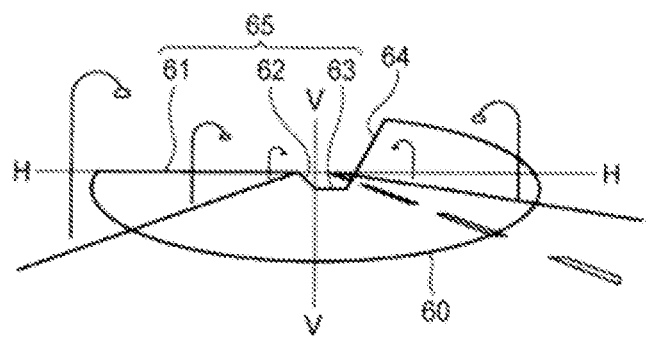
Figure 6F:
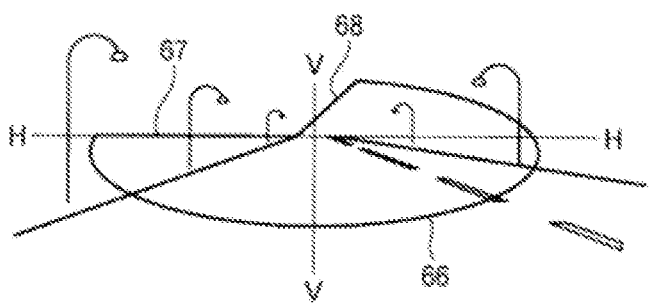

FIG. 6F is a view showing a second partial right high beam pattern 66 (an example of a third light distribution pattern) which is formed by projecting the horizontal end edge portion 36p1 and the inclined end edge portion 36p2 on to the imaginary vertical screen disposed ahead of the vehicle 10. The second partial right high beam pattern 66 has an illumination area which is wider than that of the first partial right high beam pattern 60.

The second partial right high beam pattern 66 has a horizontal cut-off line 67, and an inclined cut-off line 68. The horizontal cut-off line 67 is formed by the horizontal end edge portion 36p1 and extends along the horizontal line H-H, being used as a subject vehicle's lane side cut-off line. The inclined cut-off line 68 is formed by the inclined end edge portion 36p2 (the second end edge portion 36d22 of the first twisted end face 36d2) and extends obliquely upwards to the right from a right end of the horizontal cut-off line 67.

As shown in FIG. 6C, the space 36k through which light can pass is formed on a right-hand side of the inclined end edge portion 36p2 when seen from the front of the vehicle 10. Light which has passed through the space 36k illuminates an area lying on a right-hand side of the inclined cut-off line 68.

Namely, when the driving mechanism 37 turns the right rotary shade 36 to a position (an example of a third angular position) shown in FIG. 6C, the horizontal end edge portion 36p1 (an example of a third end edge) is projected to the front of the projection lens 34 as the horizontal cut-off line 67 (an example of a first circumferential edge portion of the third light distribution pattern). Additionally, the second end edge portion 36d22, which is part of the first twisted end face 36d2, is projected to the front of the projection lens 34 as the inclined cut-off line 68 (an example of a second circumferential edge portion of the third light distribution pattern). Light which passes above the right rotary shade 36 and through the space 36k illuminates below the horizontal cut-off line 67 and an area above the horizontal cut-off line 67, specifically, an area lying on a right-hand side of the inclined cut-off line 68 as a second partial right high beam pattern 66.

Thus, as has been described heretofore, it is found out that the state (the example of the second angular position) shown in FIG. 6A is positioned between the state shown in FIG. 5A (the example of the first angular position) and the state shown in FIG. 6C (the example of the third angular position). Next, a state will be described in detail which is present halfway between the state shown in FIG. 6A and the state shown in FIG. 6C when the right rotary shade 36 is turned from the former state to the latter state (from the example of the second angular position to the example of the third angular position).

FIG. 6B shows a state in which the right rotary shade 36 which is turned through 45 degrees from the state shown in FIG. 6A to the rear of the vehicle 10 is seen from the front of the vehicle 10. As this occurs, a first horizontal end edge portion 36m1, a first inclined end edge portion 36m2, a second horizontal end edge portion 36m3 and a second inclined end edge portion 36m4 appear at the upper end portion of the right rotary shade 36.

The first horizontal end edge portion 36m1 is disposed further leftwards than the optical axis A1 of the projection lens 34 to extend in the horizontal direction when seen from the front of the vehicle 10. The first horizontal end edge portion 36m1 is a portion which is formed by the circumferential surface of the first connecting portion 36c. The second horizontal end edge portion 36m3 is disposed further rightwards than the optical axis A1 of the projection lens 34 to extend in the horizontal direction when seen from the front of the vehicle 10. The second horizontal end edge portion 36m3 is a portion which is formed by the cylindrical portion 36d1 of the second connecting portion 36d.

The first inclined end edge portion 36m2 is disposed further leftwards than the optical axis A1 of the projection lens 34 to extend obliquely upwards in an inclined fashion from the first horizontal end edge portion 36m1 to the second horizontal end edge portion 36m3 when seen from the front of the vehicle 10. The first inclined end edge portion 36m2 is a portion which is formed by the circumferential surface of the third connecting portion 36e. The second inclined end portion 36m4 is disposed further rightwards than the optical axis A1 of the projection lens 34 to extend obliquely downwards in an inclined fashion from the second horizontal end edge portion 36m to the fourth connecting portion 36f when seen from the front of the vehicle 10. The second inclined end edge portion 36m4 is a portion which is formed by the second end edge portion 36d22 of the first twisted end face 36d2.

FIG. 6E is a view showing a light distribution pattern which is formed by projecting the first horizontal end edge portion 36m1, the first inclined end edge portion 36m2, the second horizontal end edge portion 36m3 and the second inclined end edge portion 36m4 on to the imaginary vertical screen ahead of the vehicle 10. This light distribution pattern includes a cut-off line which is similar to the first partial right high beam pattern 60 which is shown in FIG. 6D but is different therefrom only in shape. Thus, the light distribution pattern will also be referred to as a first partial right high beam pattern 60 (an example of the second light distribution pattern) and the same reference numeral will be given to a corresponding cut-off line.

The first horizontal cut-off line 61 is formed by the first horizontal end edge portion 36m1 to extend along the horizontal line H-H, being used as a subject vehicle's lane side cut-off line. The second horizontal cut-off line 63 is formed by the second horizontal end edge portion 36m3 to extend horizontally slightly below the horizontal line H-H, being used as an on-coming vehicle's lane side cut-off line.

The first inclined cut-off line 62 is formed by the first inclined end edge portion 36m2. The first inclined cut-off line 62 extends obliquely downwards to the right from a right end of the first horizontal cut-off line 61 to connect to a left end of the second horizontal cut-off line 63. The second inclined cut-off line 64 is formed by the second inclined end edge portion 36m4 (the first end edge portion 36d22 of the first twisted end face 36d2). The second cut-off line 64 extends obliquely upwards to the right from a right end of the second horizontal cut-off line 63.

As shown in FIG. 6B, the space 36k through which light can pass is formed on a right-hand side of the second inclined end edge portion 36m4 when seen from the front of the vehicle 10. Light which has passed through the space 36k illuminates an area lying on a right-hand side of the second inclined cut-off line 64.

Namely, when the driving mechanism 37 turns the right rotary shade 36 to the position shown in FIG. 6B (an example of the second angular position), the first horizontal end edge portion 36m1, the first inclined end edge portion 36m2, and the second horizontal end edge portion 36m3 (an example of the second end edge) are projected to the front of the projection lens 34 as the right lateral cut-off line 65 (an example of the first circumferential edge portion of the second light distribution pattern). Additionally, the second end edge portion 36d22, which is part of the first twisted end face 36d2, is projected to the front of the projection lens 34 as the second inclined cut-off line 64 (an example of the second circumferential edge portion of the second light distribution pattern). Light passing above the right rotary shade 36 and through the space 36k illuminates below the right lateral cut-off line 65 and an area above the right lateral cut-off line 65, specifically, an area lying on a right-hand side of the second inclined cut-off line 64 as the first partial right high beam pattern 60.

As the right rotary shade 36 turns from the state shown in FIG. 6A to the state shown in FIG. 6B, part of the first twisted end face 36d2 which is projected as the second inclined cut-off line 64 shifts from the first end edge portion 36d21 to the second end edge portion 36d22 and gradually approaches the right cylindrical portion 36b. This gradually expands the space 36k through which light can pass. Consequently, the second inclined cut-off line 64 gradually moves to the left, which increases the area of the illumination area lying on the right-hand side thereof. In association with this, the second horizontal cut-off line 63 gradually shortens.

When the right rotary shade 36 is turned further to reach the state shown in FIG. 6C, the second inclined cut-off line 64 moves to the left further, and the inclined cut-off line 68 results. As this occurs, the first inclined cut-off line 62 and the second horizontal cut-off line 63 are not formed.

FIG. 3B shows a state in which the right rotary shade 36 shown in FIG. 6B is seen from thereabove. The first twisted end face 36d2 extends around the turning axis A2 so as to intersect the second horizontal end edge portion 36j3 (an example of part of the second end edge) and the end edge portion 36c1 (an example of the third edge) in different positions in relation to the direction of the turning axis A2.

When the driving mechanism 37 turns the right rotary shade 36 from the state shown in FIG. 5A (an example of the first angular position) to the state shown in FIG. 6C (an example of the third angular position), the first twisted end face 36d2 and the second twisted end face 36d3 move from the front to the rear of the rear focal point F of the projection lens 34.

Consequently, in the states shown in FIG. 3B and FIG. 6B, almost no solid volume portion of the right rotary shade 36 is present between the rear focal point F and an incident plane of the projection lens 34. Consequently, it is possible to restrict a reduction in amount of light to be incident on the projection lens 34 which would otherwise occur as a result of part of the light which has passed through the rear focal point F being blocked or reflected.

In addition, light emitted from the light source 31 and then reflected by the reflector 33 travels from various directions towards the projection lens 34. It is light which is incident on the projection lens 34 from a direction indicated by an arrow B at FIG. 3B that affects largely the amount of light incident on the projection lens 34 when the light so travels. Specifically, it is light which passes through the space 36k from the rear of the rear focal point F of the projection lens 34 towards the optical axis A1.

The first twisted end face 36d2 and the second twisted end face 36d3 are disposed so as to approach the optical axis A1 of the projection lens 34 as they approach the projection lens 34. Consequently, the first twisted end face 36d2 and the second twisted end face 36d3 do not block the light which travels in the way described above, thereby making it possible to restrict the reduction in amount of light which is incident on the projection lens 34.

In the state shown in FIG. 6A, part of the cylindrical portion 36d1 of the second connecting portion 36d and the first twisted end face 36d2 of the right rotary shade 36 are positioned ahead of the rear focal point F of the projection lens 34 (the shape shown in FIG. 5A corresponds to the state seen from thereabove). However, since the first twisted end face 36d2 and the second twisted end face 36d3 extend so as to approach the optical axis A1 of the projection lens 34 as they approach the projection lens 34, it is difficult that the first twisted end face 36d2 and the second twisted end face 36d3 constitute an obstacle to light entering the space 36k from the direction of the arrow B. Consequently, even in the state shown in FIG. 6A, it is possible to restrict the reduction in amount of light which is incident on the projection lens 34.

Consequently, in forming the first partial right high beam pattern 60 and the second partial right high beam pattern 66 of which high illuminance is required, it is possible to avoid a risk of a desired illuminance being unable to be obtained.

As has been described above, since the first twisted end face 36d2 crosses the optical axis A1 of the projection lens 34 to extend, strictly speaking, a portion exists on the first twisted end face 36d2 which extends so as to move away from the optical axis A1 as the first twisted end face 36d2 approaches the projection lens 34. The description reading "the first twisted end face 36d2 is disposed so as to approach the optical axis A1 of the projection lens 34 as it approaches the projection lens 34" does not mean to exclude the existence of the portion which moves away from the optical axis A1. The description means to include a case where most of the first twisted end face 36d2 satisfies the requirements described above as in the case with this embodiment.

As shown in FIG. 3B and FIG. 4, the second twisted end face 36d3 of the right rotary shade 36 extends around the turning axis A2 so as to intersect the first twisted end face 36d2, the end edge portion 36g (an example of the first end edge) and the second horizontal end edge portion 36j3 (an example of the second end edge) in different positions in relation to the turning axis A2.

Consequently, the first end edge portion 36d31 of the second twisted end face 36d3 appears at the upper end portion of the right rotary shade 36 while the right rotary shade 36 is turned from the state indicated in FIG. 5A (the example of the first angular position) to the state indicated in FIG. 6A (the example of the second angular position).

The first end edge portion 36d31 of the second twisted end face 36d3 is projected to the front of the projection lens 34 as a second inclined cut-off line 64' which is shown by broken lines in FIG. 6D. The first end edge portion 36d31 of the second twisted end face 36d3 approaches gradually the right cylindrical portion 36b as the right rotary shade 36 is turned. In association with this, the space 36k gradually expands which is positioned to the left of the second twisted end face 36d3 and through which light can pass. Consequently, the second inclined cut-off line 64' moves gradually to the left, increasing the area of an illumination area which lies on a right-hand side of the second inclined cut-off line 64'.

As has been described above, a position where the first end edge portion 36d31 of the second twisted end face 36d3 intersects the end edge portion 36g (the example of the first end edge) is determined to correspond to the right end portion of the right low beam pattern 50 (the example of the first light distribution pattern). Because of this, the second inclined cut-off line 64' appears from a right end portion of the first partial right high beam pattern 60 (the example of the second light distribution pattern) and moves gradually to the left as described above.

The beam pattern changes continuously and smoothly from the right low beam pattern 50 to the first partial right high beam pattern 60 as the right rotary shade 36 turns by forming the second twisted end face 36d3 in the way described above. Consequently, it is possible to restrict the driver from having to feel the sensation of physical disorder in changing the beam patterns.

As described above, the first connecting portion 36c of the right rotary shade 36 has the concentric semi-circular cross-sectional shape which is centered at the turning axis A2 when seen from the direction following the turning axis A2. Namely, the first connecting portion 36c has the circumferential surface which extends concentrically with the turning axis A2.

Because of this, the second horizontal portion 36g2 (an example of part of the first end edge), the first horizontal end edge portions 36j1, 36m1 (an example of part of the second end edge) and the horizontal end edge portion 36p1 (an example of the third end edge) which appear sequentially at the upper end portion of the right rotary shade 36 as part of the circumferential edge while the right rotary shade 36 is turned from the state shown in FIG. 5A (the example of the first angular position) to the state shown in FIG. 6C (the example of the third angular position) extend parallel to the turning axis A2 and do not change their positions in relation to the up-to-down direction of the vehicle 10.

These end edges constitute portions of the right low beam pattern 50 (the example of the first light distribution pattern) and the first partial right high beam pattern 60 (the example of the second light distribution pattern) which are disposed so as to correspond to a central portion of the vehicle 10 in relation to the left-to-right direction thereof. In other words, those end edges constitutes the portions which change lastly or do not change their shapes when the right rotary shade 36 turns. Consequently, the change in the light distribution pattern when it shifts is reduced to a required minimum level, thereby making it possible to restrict the driver from having to feel the sensation of physical disorder.

A left lamp unit 30L is accommodated in a lamp compartment 25L of the left headlamp unit 22L. The left lamp unit 30L corresponds to a lamp unit in which the right rotary shade 36 of the right lamp unit 30R shown in FIG. 2 is replaced with a left rotary shade 46, which will be described later. The other configurations of the left lamp unit 30L remain the same as those of the right lamp unit 30R, and therefore, illustrations and descriptions which will be repetitions of what has already been illustrated and described will be omitted here.

Figure 7:
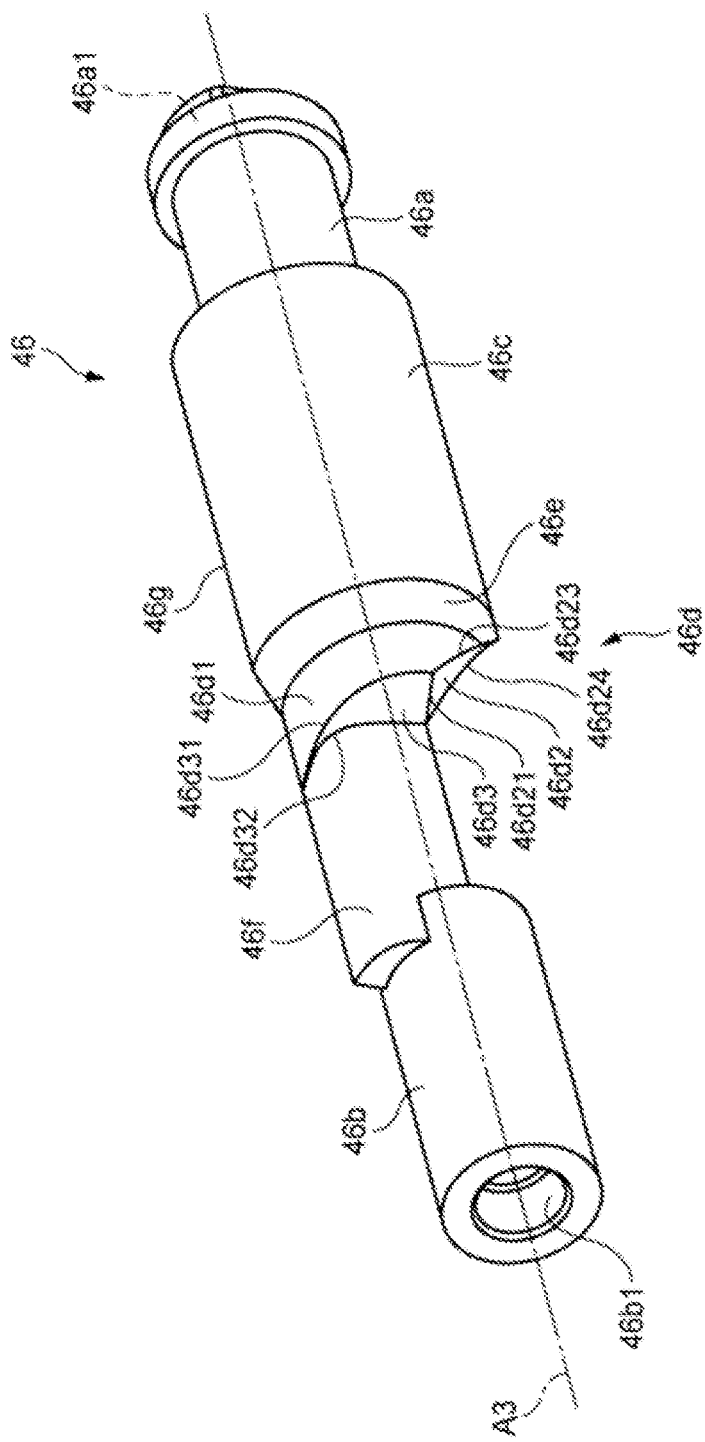
FIG. 7 is a perspective view showing an external appearance of a left rotary shade which a left lamp unit according to the embodiment of the invention.

FIG. 7 is a perspective view showing an external appearance of a left rotary shade 46. As will be described in detail later by reference to FIGS. 8 and 9, the left rotary shade 46 is shaped to have circumferential surfaces and end faces which enable differently shaped end edges to be disposed at a rear focal point F of a projection lens 34 according to a rotational angle through which left right rotary shade 46 is driven by a driving mechanism 37.

Light emitted from a light source 31 is reflected by a reflector 33 to travel to the front. Part of the light is blocked by the left rotary shade 46. As this occurs, the shape of an end edge of the left rotary shade 46 which is disposed at the rear focal point F of the projection lens 34 is projected as a circumferential edge of a light distribution pattern which is formed ahead of the vehicle 10.

As shown in FIG. 7, the left rotary shade 46 includes a left cylindrical portion 46a, a right cylindrical portion 46b, a first connecting portion 46c, a second connecting portion 46d, a third connecting portion 46e, and a fourth connecting portion 46f.

The left cylindrical portion 46a has a cross section which looks like a concentric circle which is centered at a turning axis A3 when seen from a direction following the turning axis A3. An axial hole 46a1 is formed in the left cylindrical portion 46a and this axial hole 46a1 is coaxial with the turning axis A3. The axial hole 46a1 is connected with the driving mechanism 37.

The right cylindrical portion 46b has a cross section which looks like a concentric circle which is centered at the turning axis A3 when seen from the direction following the turning axis A3. An axial hole 46b1 is formed in the right cylindrical portion 46b and this axial hole 4b1 is coaxial with the turning axis A3. The axial hole 46b1 is supported by a supporting mechanism 38.

The first connecting portion 46c is a portion which is formed continuously to the left cylindrical portion 46a and is disposed at a left-hand side of the left cylindrical portion 46a when seen from the front of the vehicle 10. The first connecting portion 46c has a cross section which looks like a concentric semi-circle which is centered at the turning axis A3 when seen from the direction following the turning axis A3. A radius of the concentric semi-circle is greater than a radius of the concentric circle which forms the cross section of the left cylindrical portion 46a.

The second connecting portion 46d is a portion which is disposed at a left-hand side of the first connecting portion 46c when seen from the front of the vehicle 10 and has a cylindrical portion 46d1, a first twisted end face 46d2 and a second twisted end face 46d3. The cylindrical portion 46d1 has a cross section which is formed based on a concentric semi-circle which is centered at the turning axis A3 when seen from the direction following the turning axis A3 and which exhibits a shape which is partially cut away by the first twisted end face 46d2 and the second twisted end face 46d3. A radius of the concentric semi-circle is greater than the radius of the concentric circle which forms the cross section of the first connecting portion 46c.

The third connecting portion 46e is a portion which is formed continuously to the first connecting portion 46c and the cylindrical portion 46d1 of the second connecting portion 46d to connect them together. Namely, the third connecting portion 46e is a surface which extends around the turning axis A3 so as to connect a semi-cylindrical circumferential surface which is formed by the first connecting portion 46c with a circumferential surface which is formed by the cylindrical portion 46d1 of the second connecting portion 46d and which is inclined along the direction of the turning axis A3. As shown in FIGS. 8 and 9, a boundary between the first connecting portion 46c and the second connecting portion 46d is disposed so as to pass through the rear focal point F of the projection lens 34.

The fourth connecting portion 46f is a portion which is formed continuously to the right cylindrical portion 46b and the second twisted end face 46d3 of the second connecting portion 46d to connect them together. The shapes of the first twisted end face 46d2, the second twisted end face 46d3 and the fourth connecting portion 46f will be described in detail later by reference to FIGS. 8 and 9, too.

Figure 8A:
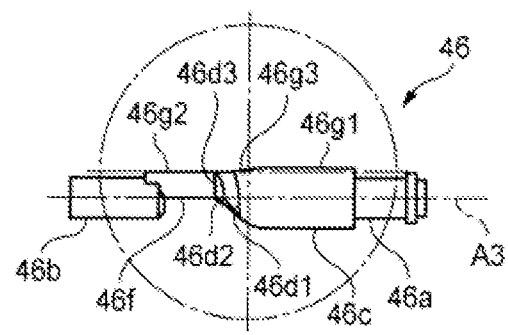
FIGS. 8A to 8D show views depicting relationships between rotational angular positions of the left rotary shade and light distribution patterns to be formed.

Respective portions of circumferential surfaces which are formed by the first connecting portion 46c, the second connecting portion 46d, the third connecting portion 46e and the fourth connecting portion 46f are chamfered to form a flat end edge portion 46g which extends in a direction parallel to the turning axis A3. FIG. 8A shows a state in which the left rotary shade 46 is seen from the front of the vehicle 10 which is turned by the driving mechanism 37 to an angular position where an end edge portion 46g is disposed at the rear focal point F of the projection lens 34.

As this occurs, the end edge portion 46g includes a first horizontal portion 46g1, a second horizontal portion 46g2 and an inclined portion 46g3. The first horizontal portion 46g1 is disposed further rightwards than an optical axis A1 of the projection lens 34 to extend in a horizontal direction when seen from the front of the vehicle 10. The first horizontal portion 46g1 is a portion which is formed by the first connecting portion 46c. The second horizontal portion 46g2 is disposed further leftwards than the optical axis A1 of the projection lens 34 to extend in the horizontal direction when seen from the front of the vehicle 10. The second horizontal portion 46g2 is a portion which is formed by the second connecting portion 46d and the fourth connecting portion 46f. The inclined portion 46g3 extends obliquely downwards in an inclined fashion from the first horizontal portion 46g1 to the second horizontal portion 46g2. The inclined portion 46g3 is a portion which is formed by the third connecting portion 46e.

Figure 8B:
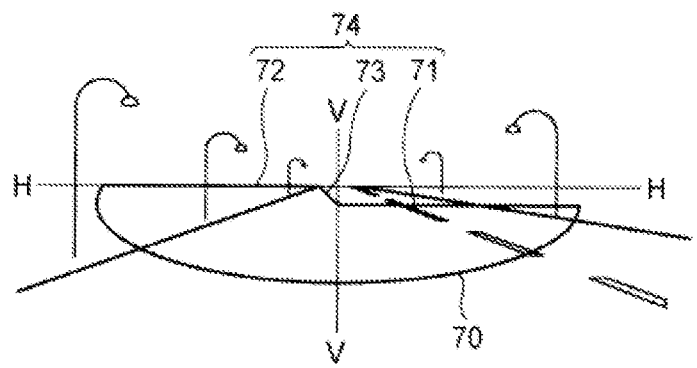

FIG. 8B is a view showing a left low beam pattern 70 (an example of the first light distribution pattern) which is formed as a result of the end edge portion 46g being projected on to an imaginary vertical screen which is disposed ahead of the vehicle 10.

The left low beam pattern 70 has a first horizontal cut-off line 71, a second horizontal cut-off line 72, and an inclined cut-off line 73 at an upper end edge thereof. In the following description, the first horizontal cut-off line 71, the second cut-off line 72 and the inclined cut-off line 73 will generally be referred to as a "right lateral cut-off line 74" as required.

The first horizontal cut-off line 71 is formed by the first horizontal portion 46g1 of the end edge portion 46g and extends horizontally slightly below a horizontal line H-H, being used as an on-coining vehicle's lane side cut-off line. The second horizontal cut-off line 72 is formed by the second horizontal portion 46g2 of the end edge portion 46g and extends along the horizontal line H-H, being used as a subject vehicle's lane side cut-off line. The inclined cut-off line 73 is formed by the inclined portion 46g3 of the end edge portion 46g and extends obliquely upwards towards the left from a left end of the first horizontal cut-off line 71 to connect to a right end of the second horizontal cut-off line 72.

Namely, when the driving mechanism 37 turns the left rotary shade 46 to a position (an example of the first angular position) shown in FIG. 8A, the end edge portion 46g (an example of a first end edge) is projected to the front of the projection lens 34 as the right lateral cut-off line 74 (an example of a circumferential edge portion of the first light distribution pattern). Light passing above the end edge portion 46g illuminates below the right lateral cut-off line 74 as the left low beam pattern 70.

Figure 8C:
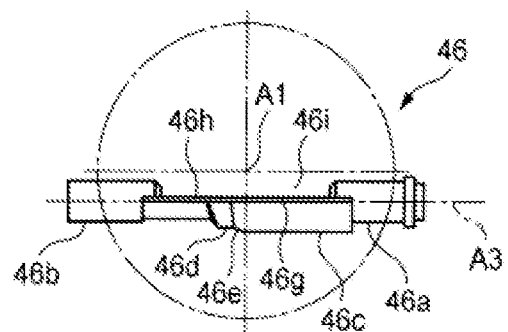
Figure 8D:
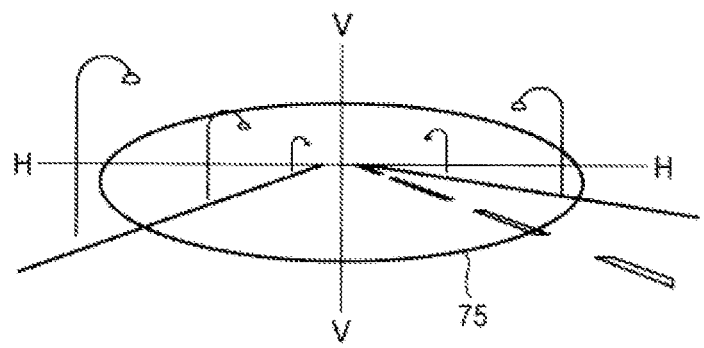

FIG. 8C shows a state in which the left rotary shade 46 which is turned through about 90 degrees towards the front of the vehicle 10 from the state shown in FIG. 8A is seen from the front of the vehicle 10. Respective portions of the first connecting portion 46c, the second connecting portion 46d, the third connecting portion 46e and the fourth connecting portion 46f form a flat surface 46h which continues along the turning axis A3. The flat surface 46h defines a space 46i between the left cylindrical portion 46a and the right cylindrical portion 46b.

The space 46i opens a space which includes the optical axis A1 of the projection lens 34. Because of this, light emitted from the light source 31 and reflected by the reflector 33 passes through the space 46i and the projection lens 34 without being blocked and forms a left high beam pattern 75 shown in FIG. 8D ahead of the vehicle 10. The left high beam pattern 75 is a light distribution pattern which illuminates over a wide range to a far field ahead of the vehicle 10.

Figure 9A:
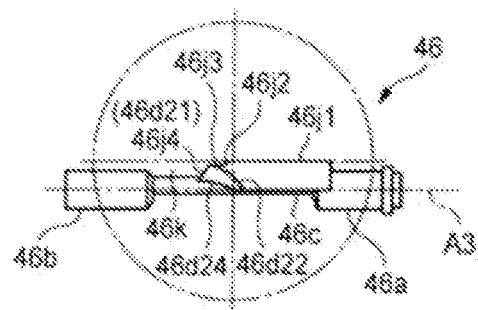
FIGS. 9A to 9F show views depicting relationships between rotational angular positions of the left rotary shade and light distribution patterns to be formed.
Figure 9B:
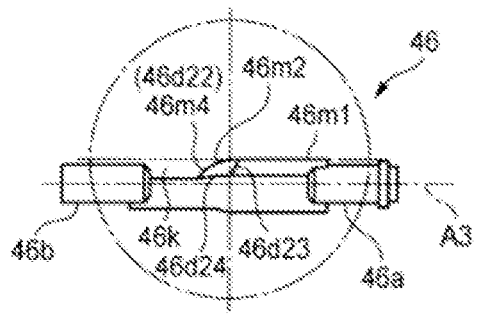
Figure 9C:
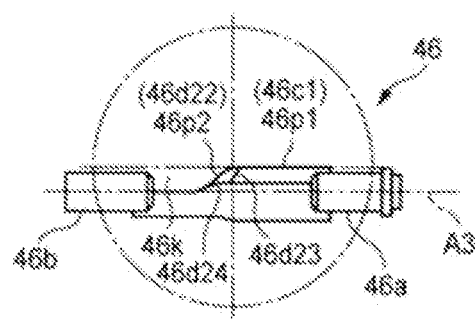

FIG. 9A shows a state in which the left rotary shade 46 which is turned through 90 degrees towards the rear of the vehicle 10 from the state shown in FIG. 8A is seen from the front of the vehicle 10. FIGS. 9B and 9C show states in which the left rotary shade 46 which is turned further towards the rear of the vehicle 10 from the state shown in FIG. 9A is seen from the front of the vehicle 10.

As shown in FIG. 7 and FIGS. 9A to 9C, the first twisted end face 46d2 is an end face which is defined by a first end edge portion 46d21, a second end edge portion 46d22, a third end edge portion 46d23, and a fourth end edge portion 46d24.

The first end edge portion 46d21 is a straight end edge which intersects the cylindrical portion 46d1 of the second connecting portion 46d and the fourth connecting portion 46f and which defines a boundary between the second twisted end face 46d3 and the first twisted end face 46d2.

As is clear from FIGS. 9A to 9C, the first twisted end face 46d2 crosses not only the cylindrical portion 46d1 of the second connecting portion 46d but also a position corresponding to the optical axis A1 of the projection lens 34 and extends in such a way as to cut out portions of the third connecting portion 46e and the first connecting portion 46c. The second end edge portion 46d22 is a curvilinear end edge which approaches the left cylindrical portion 46a while intersecting sequentially circumferential surfaces of the cylindrical portion 46d1, the third connecting portion 46e and the first connecting portion 46c.

The third end edge portion 46d23 is a linear end edge which defines a boundary between the first twisted end face 46d2 and the flat surface 46h. The second end edge portion 46d22 and the third end edge portion 46d23 intersect an end edge portion 46c 1 where a circumferential surface of the first connecting portion 46c and the flat surface 46h intersect. The fourth end edge portion 46d24 is a curvilinear end edge which connects the first end edge portion 46d21 and the third end edge portion 46d23 together.

The second twisted end edge 46d3 is an end face which is defined by the first end edge portion 46d31, the second end edge portion 46d32 and the first end edge portion 46d21 of the first twisted end face 46d2.

The first end edge portion 46d31 is a curvilinear end edge which defines a boundary between the second connecting portion 46*d* and the fourth connecting portion 46*f* in a position where it intersects the end edge portion 46*g*. The first end edge portion 46*d*31 approaches the third connecting portion 46*e* while intersecting the circumferential surface of the cylindrical portion 46*d*1 and extends to a position where it intersects the first end edge portion 46*d*21 of the first twisted end face 46*d*2. The first end edge portion 46*d*31 extends in this way to thereby define a boundary between the cylindrical portion 46*d*1 and the second twisted end face 46*d*3.

The second end edge portion 46*d*32 is a curvilinear end edge which defines a boundary between the second connecting portion 46*d* and the fourth connecting portion 46*f* together with the first end edge portion 46*d*31 in a position where it intersects the end edge portion 46*g*. The second end edge portion 46*d*32 extends to a position where it intersects the first end edge portion 46*d*21 of the first twisted end face 46*d*2 while intersecting the circumferential surface of the fourth connecting portion 46*f*. This defines a boundary between the fourth connecting portion 46*f* and the second twisted end face 46*d*3.

In a state shown in FIG. 9A, a first horizontal end edge portion 46*j*1, a first inclined end edge portion 46*j*2, a second horizontal end edge portion 46*j*3 and a second inclined end edge portion 46*j*4 appear at the upper end portion of the left rotary shade 46.

The first horizontal end edge portion 46*j*1 is a portion which is disposed further rightwards than the optical axis A1 of the projection lens 34 to extend in the horizontal direction when seen from the front of the vehicle 10 and which is formed by the circumferential surface of the first connecting portion 46*c*. The second horizontal end edge portion 46*j*3 is a portion which is disposed further leftwards than the optical axis A1 of the projection lens 34 to extend in the horizontal direction when seen from the front of the vehicle 10 and which is formed by the cylindrical portion 46*d*1 of the second connecting portion 46*d*.

The first inclined end edge portion 46*j*2 is disposed further leftwards than the optical axis A1 of the projection lens 34 to extend obliquely upwards in an inclined fashion from the first horizontal end edge portion 46*j*1 to the second horizontal end edge portion 46*j*3 when seen from the front of the vehicle 10. The first inclined end edge portion 46*j*2 is a portion which is formed by a circumferential surface of the third connecting portion 46*e*. The second inclined end edge portion 46*j*4 is disposed further leftwards than the optical axis A1 of the projection lens 34 to extend obliquely downwards in an inclined fashion from the second horizontal end edge portion 46*j*3 to the fourth connecting portion 46*f* when seen from the front of the vehicle 10. The second inclined end edge portion 46*j*4 is a portion which is formed by the first end edge portion 46*d*21 of the first twisted end face 46*d*2.

Figure 9D:
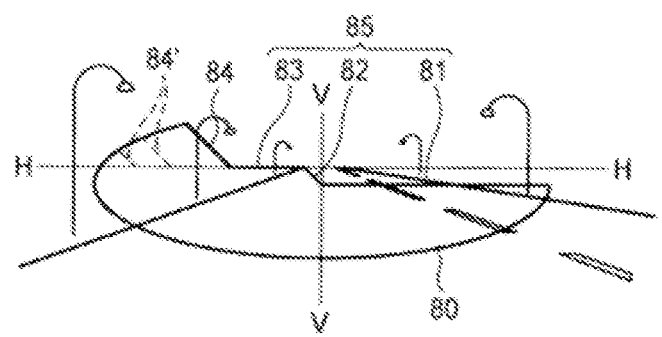

FIG. 9D is a view showing a first partial left high beam pattern 80 (an example of the second light distribution pattern) which is formed by projecting the first horizontal end edge portion 46*j*1, the first inclined end edge portion 46*j*2, the second horizontal end edge portion 46*j*3 and the second inclined end edge portion 46*j*4 on to the imaginary vertical screen disposed ahead of the vehicle 10. This first partial left high beam pattern 80 has an illumination area which is wider than that of the left low beam pattern 70.

The first partial left high beam pattern 80 has a first horizontal cut-off line 81, a first inclined cut-off line 82, a second horizontal cut-off line 83 and a second inclined cut-off line 84. In the following description, the first horizontal cut-off line 81, the first inclined cut-off line 82, and the second horizontal cut-off line 83 will be generally referred to as a "right lateral cut-off line 85".

The first horizontal cut-off line 81 is formed by the second horizontal end edge portion 46*j*3 and extends horizontally slightly below the horizontal line H-H, being used as an on-coming vehicle's lane side cut-off line. The second horizontal cut-off line 83 is formed by the first horizontal end edge portion 46*j*1 and extends along the horizontal line H-H, being used a subject vehicle's lane side cut-off line.

The first inclined cut-off line 82 is formed by the first inclined end edge portion 46*j*2 and extends obliquely upwards towards the left from a left end of the first horizontal cut-off line 81 to connect to a right end of the second horizontal cut-off line 83. The second inclined cut-off line 84 is formed by the second inclined end edge portion 46*j*4 (the first end edge portion 46*d*21 of the first twisted end face 46*d*2) and extends obliquely upwards towards the left from a left end of the second horizontal cut-off line 83.

As shown in FIG. 9A, a space 46*k* through which light can pass is formed on a left-hand side of the second inclined end edge portion 46*j*4 when seen from the front of the vehicle 10. Light which has passed through the space 46*k* illuminates an area lying on a left-hand side of the second inclined cut-off line 84.

Namely, when the driving mechanism 37 turns the left rotary shade 46 to a position (an example of the second angular position) shown in FIG. 9A, the first horizontal end edge portion 46*j*1, the first inclined end edge portion 46*j*2 and the second horizontal end edge portion 46*j*3 (an example of a second end edge) are projected to the front of the projection lens 34 as the right lateral cut-off line 85 (an example of a first circumferential edge portion of the second light distribution pattern). Additionally, the first end edge portion 46*d*21, which is part of the first twisted end face 46*d*2, is projected to the front of the projection lens 34 as the second inclined cut-off line 84 (an example of a second circumferential portion of the second light distribution pattern). Light which passes above the left rotary shade 46 and through the space 46*k* illuminates below the right lateral cut-off line 85 and an area above the right lateral cut-off line 85, specifically, an area lying on a left-hand side of the second inclined cut-off line 84 as the first partial left high beam pattern 80.

FIG. 9C shows a state in which the left rotary shade 46 which is turned through 90 degrees towards the rear of the vehicle 10 from the state shown in FIG. 9A is seen from the front of the vehicle 10. As this occurs, a horizontal end edge portion 46*p*1 and an inclined end edge portion 46*p*2 appear at the upper end portion of the left rotary shade 46.

The horizontal end edge portion 46*p*1 is disposed further rightwards than the optical axis A1 of the projection lens 34 to extend horizontally when seen from the front of the vehicle 10. The first horizontal end edge portion 46*p*1 is a portion which is formed by the end edge portion 46*c*1 of the first connecting portion 46*c*. The inclined end edge portion 46*p*2 is disposed further leftwards than the optical axis A1 of the projection lens 34 to extend obliquely downwards in an inclined fashion from the horizontal end edge portion 46*p*1 towards the fourth connecting portion 46*f* when seen from the front of the vehicle 10. The inclined end edge portion 46*p*2 is a portion which is formed by the second end edge portion 46*d*22 of the first twisted end face 46*d*2.

Figure 9E:
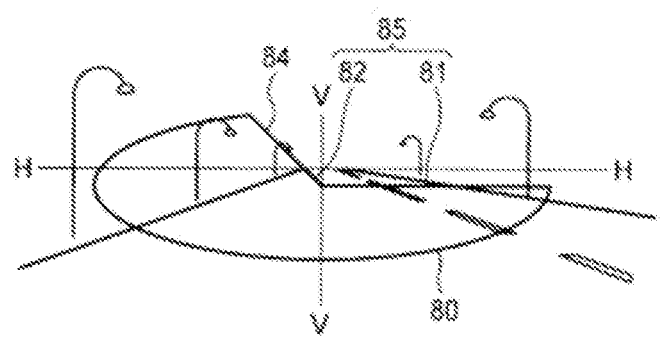
Figure 9F:
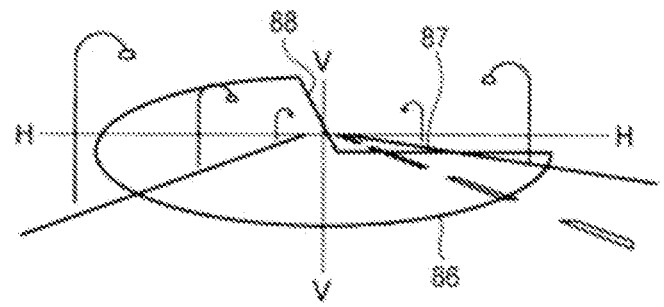

FIG. 9F is a view showing a second partial left high beam pattern 86 (an example of a third light distribution pattern) which is formed by projecting the horizontal end edge portion 46*p*1 and the inclined end edge portion 46*p*2 on to the imaginary vertical screen disposed ahead of the vehicle 10. The second partial left high beam pattern 86 has an illumination area which is wider than that of the first partial left high beam pattern 80.

The second partial left high beam pattern 86 has a horizontal cut-off line 87, and an inclined cut-off line 88. The horizontal cut-off line 87 is formed by the horizontal end edge portion 46$p$1 and extends horizontally slightly below the horizontal line H-H, being used as an on-coming vehicle's lane side cut-off line. The inclined cut-off line 88 is formed by the inclined end edge portion 46$p$2 (the second end edge portion 46$d$22 of the first twisted end face 46$d$2) and extends obliquely upwards to the left from a left end of the horizontal cut-off line 87.

As shown in FIG. 9C, the space 46$k$ through which light can pass is formed on a left-hand side of the inclined end edge portion 46$p$2 when seen from the front of the vehicle 10. Light which has passed through the space 46$k$ illuminates an area lying on a left-hand side of the inclined cut-off line 88.

Namely, when the driving mechanism 37 turns the left rotary shade 46 to a position (an example of a third angular position) shown in FIG. 9C, the horizontal end edge portion 46$p$1 (an example of a third end edge) is projected to the front of the projection lens 34 as the horizontal cut-off line 87 (an example of a first circumferential edge portion of the third light distribution pattern). Additionally, the second end edge portion 46$d$22, which is part of the first twisted end face 46$d$2, is projected to the front of the projection lens 34 as the inclined cut-off line 88 (an example of a second circumferential edge portion of the third light distribution pattern). Light which passes above the left rotary shade 46 and through the space 46$k$ illuminates below the horizontal cut-off line 87 and an area above the horizontal cut-off line 87, specifically, an area lying on a left-hand side of the inclined cut-off line 88 as a second partial left high beam pattern 86.

Thus, as has been described heretofore, it is found out that the state (the example of the second angular position) shown in FIG. 9A is positioned between the state shown in FIG. 8A (the example of the first angular position) and the state shown in FIG. 9C (the example of the third angular position). Next, a state will be described in detail which is present halfway between the state shown in FIG. 9A and the state shown in FIG. 9C when the left rotary shade 46 is turned from the former state to the latter state (from the example of the second angular position to the example of the third angular position).

FIG. 9B shows a state in which the left rotary shade 46 which is turned through 45 degrees from the state shown in FIG. 9A to the rear of the vehicle 10 is seen from the front of the vehicle 10. As this occurs, a horizontal end edge portion 46$m$1, a first inclined end edge portion 46$m$2, and a second inclined end edge portion 46$m$4 appear at the upper end portion of the left rotary shade 46.

The horizontal end edge portion 46$m$1 is disposed further rightwards than the optical axis A1 of the projection lens 34 to extend in the horizontal direction when seen from the front of the vehicle 10. The horizontal end edge portion 46$m$1 is a portion which is formed by the circumferential surface of the first connecting portion 46$c$. The first inclined end edge portion 46$m$2 is disposed further leftwards than the optical axis A1 of the projection lens 34 to extend obliquely downwards in an inclined fashion from the horizontal end edge portion 46$m$1 when seen from the front of the vehicle 10. The first inclined end edge portion 46$m$2 is a portion which is formed by the circumferential surface of the third connecting portion 46$e$. The second inclined end portion 46$m$4 is disposed further leftwards than the optical axis A1 of the projection lens 34 to extend obliquely downwards in an inclined fashion from the first inclined end edge portion 46$m$2 to the fourth connecting portion 46$f$ when seen from the front of the vehicle 10. The second inclined end edge portion 46$m$4 is a portion which is formed by the second end edge portion 46$d$22 of the first twisted end face 46$d$2.

FIG. 9E is a view showing a light distribution pattern which is formed by projecting the horizontal end edge portion 46$m$1, the first inclined end edge portion 46$m$2, and the second inclined end edge portion 46$m$4 on to the imaginary vertical screen ahead of the vehicle 10. This light distribution pattern includes a cut-off line which is similar to the first partial left high beam pattern 80 which is shown in FIG. 9D but is different therefrom only in shape. Thus, the light distribution pattern will also be referred to as a first partial left high beam pattern 80 (an example of the second light distribution pattern) and the same reference numeral will be given to a corresponding cut-off line.

The first horizontal cut-off line 81 is formed by the horizontal end edge portion 46$m$1 to extend horizontally slightly below the horizontal line H-H, being used as an on-coining vehicle's lane side cut-off line. The first inclined cut-off line 82 is formed by the first inclined end edge portion 46$m$2. The first inclined cut-off line 82 extends obliquely upwards to the left from a left end of the first horizontal cut-off line 81 to connect to a right end of the second inclined cut-off line 84. The second inclined cut-off line 84 is formed by the second inclined end edge portion 46$m$4 (the first end edge portion 46$d$22 of the first twisted end face 46$d$2) to extend obliquely upwards to the left from a left end of the second inclined cut-off line 82.

As shown in FIG. 9B, the space 46$k$ through which light can pass is formed on a left-hand side of the second inclined end edge portion 36$m$4 when seen from the front of the vehicle 10. Light which has passed through the space 46$k$ illuminates an area lying on a right-hand side of the second inclined cut-off line 84.

Namely, when the driving mechanism 37 turns the left rotary shade 46 to the position shown in FIG. 9B (an example of the second angular position), the horizontal end edge portion 46$m$1 and the first inclined end edge portion 46$m$2 (an example of the second end edge) are projected to the front of the projection lens 34 as the right lateral cut-off line 85 (an example of the first circumferential edge portion of the second light distribution pattern). Additionally, the second end edge portion 46$d$22, which is part of the first twisted end face 46$d$2, is projected to the front of the projection lens 34 as the second inclined cut-off line 84 (an example of the second circumferential edge portion of the second light distribution pattern). Light passing above the left rotary shade 46 and through the space 46$k$ illuminates below the right lateral cut-off line 85 and an area above the right lateral cut-off line 85, specifically, an area lying on a left-hand side of the second inclined cut-off line 84 as the first partial left high beam pattern 80.

As the left rotary shade 46 turns from the state shown in FIG. 9A to the state shown in FIG. 9B, part of the first twisted end face 46$d$2 which is projected as the second inclined cut-off line 84 shifts from the first end edge portion 46$d$21 to the second end edge portion 46$d$22 and gradually approaches the left cylindrical portion 46$a$. This gradually expands the space 46$k$ through which light can pass. Consequently, the second inclined cut-off line 84 gradually moves to the right, which increases the area of the illumination area lying on the left-hand side thereof. In association with this, the second horizontal cut-off line 83 gradually shortens.

When the left rotary shade 46 is turned further to reach the state shown in FIG. 9C, the second inclined cut-off line 84 moves to the right further, and the inclined cut-off line 88 results. As this occurs, the first inclined cut-off line 82 and the second horizontal cut-off line 83 are not formed.

As with the first twisted end face 36d2 of the right rotary shade 36, the first twisted end face 46d2 extends around the turning axis A3 so as to intersect the second horizontal end edge portion 46j3 (an example of pan of the second end edge) and the end edge portion 46c1 (an example of the third edge) in different positions in relation to the direction of the turning axis A3.

When the driving mechanism 37 turns the left rotary shade 46 from the state shown in FIG. 8A (an example of the first angular position) to the state shown in FIG. 9C (an example of the third angular position), the first twisted end face 46d2 and the second twisted end face 46d3 move from the front to the rear of the rear focal point F of the projection lens 34.

Consequently, in the states shown in FIG. 9B, almost no solid volume portion of the left rotary shade 46 is present between the rear focal point F and an incident plane of the projection lens 34. Consequently, it is possible to restrict a reduction in amount of light to be incident on the projection lens 34 which would otherwise occur as a result of part of the light which has passed through the rear focal point F being blocked or reflected.

In addition, light emitted from the light source 31 and then reflected by the reflector 33 travels from various directions towards the projection lens 34. It is light which passes through the space 46k from the rear of the rear focal point F of the projection lens 34 towards the optical axis A1 that affects largely the amount of light incident on the projection lens 34 when the light so travels.

As with the first twisted end face 36d2 and the second twisted end face 36d3 of the right rotary shade 36, the first twisted end face 46d2 and the second twisted end face 46d3 of this embodiment are disposed so as to approach the optical axis A1 of the projection lens 34 as they approach the projection lens 34. Consequently, the first twisted end face 46d2 and the second twisted end face 46d3 do not block the light which travels in the way described above, thereby making it possible to restrict the reduction in amount of light which is incident on the projection lens 34.

In the state shown in FIG. 9A, part of the cylindrical portion 46d1 of the second connecting portion 46d and the first twisted end face 46d2 of the left rotary shade 46 are positioned ahead of the rear focal point F of the projection lens 34 (the shape shown in FIG. 8A corresponds to the state seen from thereabove). However, since the first twisted end face 46d2 and the second twisted end face 46d3 extend so as to approach the optical axis A1 of the projection lens 34 as they approach the projection lens 34, it is difficult that the first twisted end face 46d2 and the second twisted end face 46d3 constitute an obstacle to light entering the space 46k from the direction of the arrow B. Consequently, even in the state shown in FIG. 9A, it is possible to restrict the reduction in amount of light which is incident on the projection lens 34.

Consequently, in forming the first partial left high beam pattern 80 and the second partial left high beam pattern 86 of which high illuminance is required, it is possible to avoid a risk of a desired illuminance being unable to be obtained.

As has been described above, since the first twisted end face 46d2 crosses the optical axis A1 of the projection lens 34 to extend, strictly speaking, a portion exists on the first twisted end face 46d2 which extends so as to move away from the optical axis A1 as the first twisted end face 46d2 approaches the projection lens 34. The description reading "the first twisted end face 46d2 is disposed so as to approach the optical axis A1 of the projection lens 34 as it approaches the projection lens 34" does not mean to exclude the existence of the portion which moves away from the optical axis A1. The description means to include a case where most of the first twisted end face 46d2 satisfies the requirements described above as in the case with this embodiment.

As shown in FIG. 7, the second twisted end face 46d3 of the left rotary shade 46 of this embodiment extends around the turning axis A3 so as to intersect the first twisted end face 46d2, the end edge portion 46g (an example of the first end edge) and the second horizontal end edge portion 46j3 (an example of the second end edge) in different positions in relation to the turning axis A3.

Consequently, the first end edge portion 46d31 of the second twisted end face 46d3 appears at the upper end portion of the left rotary shade 46 while the left rotary shade 46 is turned from the state shown in FIG. 8A (the example of the first angular position) to the state shown in FIG. 9A (the example of the second angular position).

The first end edge portion 46d31 of the second twisted end face 46d3 is projected to the front of the projection lens 34 as a second inclined cut-off line 84' which is shown by broken lines in FIG. 9A. The first end edge portion 46d31 of the second twisted end face 46d3 approaches gradually the left cylindrical portion 46a as the left rotary shade 46 is turned. In association with this, the space 46k gradually expands through which light can pass and which is positioned to the right of the second twisted end face 46d3. Consequently, the second inclined cut-off line 84' moves gradually to the right, increasing the area of an illumination area which lies on a left-hand side of the second inclined cut-off line 84'.

As has been described above, a position where the first end edge portion 46d31 of the second twisted end face 46d3 intersects the end edge portion 46g (the example of the first end edge) is determined to correspond to the left end portion of the left low beam pattern 70 (the example of the first light distribution pattern). Because of this, the second inclined cut-off line 84' appears from a left end portion of the first partial left high beam pattern 80 (the example of the second light distribution pattern) and moves gradually to the right as described above.

The beam pattern changes continuously and smoothly from the left low beam pattern 70 to the first partial left high beam pattern 80 as the left rotary shade 46 turns by forming the second twisted end face 46d3 in the way described above. Consequently, it is possible to restrict the driver from having to feel the sensation of physical disorder in changing the beam patterns.

As described above, the first connecting portion 46c of the left rotary shade 46 has the concentric semi-circular cross-sectional shape which is centered at the turning axis A3 when seen from the direction following the turning axis A3. Namely, the first connecting portion 46c has the circumferential surface which extends concentrically with the turning axis A3.

Because of this, the first horizontal portion 46g1 (an example of part of the first end edge), the first horizontal end edge portion 46j1 and the horizontal end edge portion 46m1 (an example of part of the second end edge), and the horizontal end edge portion 46*p*1 (an example of the third end edge) which appear sequentially at the upper end portion of the left rotary shade 46 as part of the circumferential edge while the left rotary shade 46 is turned from the state shown in FIG. 8A to the state shown in FIG. 9C extend parallel to the turning axis A3 and do not change their positions in relation to the up-to-down direction of the vehicle 10.

These end edges constitute portions of the left low beam pattern 70 (the example of the first light distribution pattern) and the first partial left high beam pattern 80 (the example of the second light distribution pattern) which are disposed so as to correspond to a central portion of the vehicle 10 in relation to a left-to-right direction thereof. In other words, those end edges constitutes the portions which change lastly or do not change their shapes when the left rotary shade 46 turns. Consequently, the change in the light distribution pattern when it shifts is reduced to a required minimum level, thereby making it possible to restrict the driver from having to feel the sensation of physical disorder.

Figure 10A:
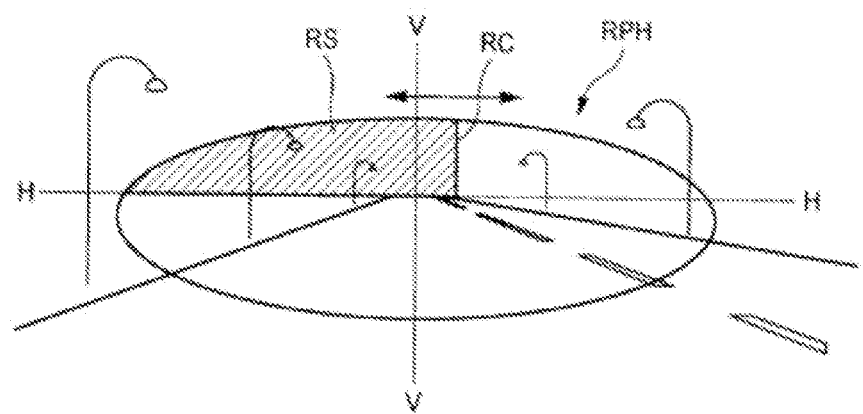
FIGS. 10A to 10C show views depicting partial high beam patterns formed by the left and right lamp units.
Figure 10B:
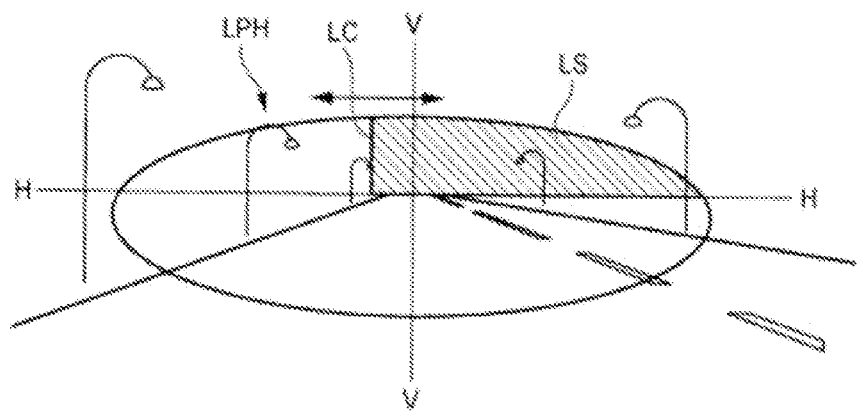

Next, referring to FIGS. 10A to 10C, light distribution patterns will be described which are formed by the right lamp unit 30R and the left lamp unit 30L which are configured as has been described heretofore. FIG. 10A is a view showing schematically a partial right high beam pattern RPH (corresponding to the first partial right high beam pattern 60 or the second partial right high beam pattern 66) which is formed by the right lamp unit 30R. FIG. 10B is a view showing schematically a partial left high beam pattern LPH (corresponding to the first partial left high beam pattern 80 or the second partial left high beam pattern 86) which is formed by the left lamp unit 30L.

In the right lamp unit 30R, as shown in FIG. 10A, a right non-illuminated area RS is formed at part of the high beam pattern as a result of part of light emitted from the light source 31 being blocked by the right rotary shade 36. The right non-illuminated area RS has a right cut-off line RC which corresponds to the second inclined cut-off line 64 or the inclined cut-off line 68.

By turning the right rotary shade 36, the right cut-off line RC moves in the left-to-right direction within a high beam illumination area according to an angular position of the right rotary shade 36, changing the area of the right non-illuminated area RS. In other words, the shape of the partial right high beam pattern RPH is changed.

In the left lamp unit 30L, as shown in FIG. 10B, a left non-illuminated area LS is formed at part of the high beam pattern as a result of part of light emitted from the light source 31 being blocked by the left rotary shade 46. The left non-illuminated area LS has a left cut-off line LC which corresponds to the second inclined cut-off line 84 or the inclined cut-off line 88.

By turning the left rotary shade 46, the left cut-off line LC moves in the left-to-right direction within the high beam illumination area according to an angular position of the left rotary shade 46, changing the area of the left non-illuminated area LS. In other words, the shape of the partial left high beam pattern LPH is changed.

Figure 10C:
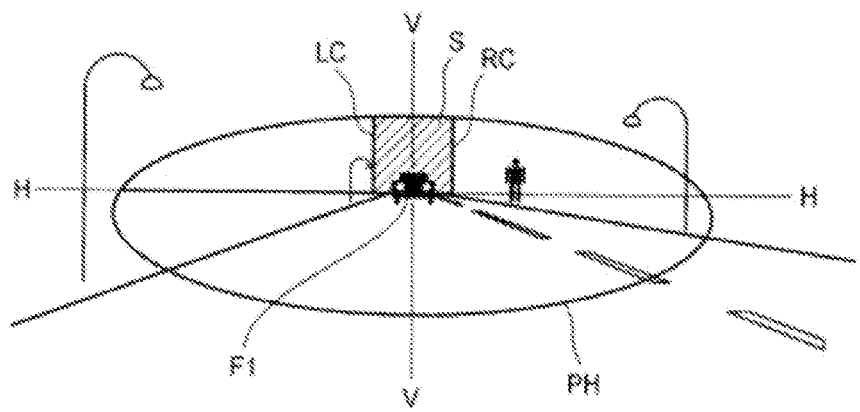

FIG. 10C shows a partial high beam pattern PH which is obtained by superposing the partial right high beam pattern RPH and the partial left high beam pattern LPH one on the other. The portion where the right non-illuminated area RS and the left non-illuminated area LS are superposed one on the other constitutes a non-illuminated area S.

The non-illuminated area S is formed to restrict the glare to a preceding vehicle which is detected, for example, in the high beam illumination area. In FIG. 10C, a preceding vehicle F1 exists on the subject vehicle's lane, and the positions of the right cut-off line RC and the left cut-off line LC are determined so that the preceding vehicle F1 is accommodated in the non-illuminated area S.

In the event that the preceding vehicle or the like is not present, in the right lamp unit 30R and the left lamp unit 30L, the right rotary shade 36 and the left rotary shade 46 are turned to the angular positions (the states shown in FIG. 5C and FIG. 8C) where light beams emitted from the corresponding light sources 31 are not blocked by the corresponding rotary shades 36, 46 to thereby form the right high beam pattern 55 and the left high beam pattern 75, respectively. A high beam pattern which does not include the non-illuminated area S is formed by superposing those high beam patterns.

The unified control unit 14 detects the presence of a preceding vehicle or a pedestrian based on an image captured ahead of the vehicle 10 by the camera 18 and determines on the necessity of forming the partial high beam pattern PH. In case the unified control unit 14 determines that the partial high beam pattern PH needs to be formed, the unified control unit 14 determines the position and range where the non-illuminated area S is to be formed based on the position of the object detected through the camera 18, the speed of the vehicle 10 detected by the wheel speed sensors 16 and the traveling direction of the vehicle 10 which is detected by the steering angle sensor 17.

As has been described above, the position and range of the non-illuminated area S are determined by the positions of the right cut-off ling RC and the left cut-off line LC, that is, by the angular positions of the right rotary shade 36 and the left rotary shade 46. The unified control unit 14 generates control signals which turn the right rotary shade 36 and the left rotary shade 46 to the angular positions where to realize the non-illuminated area S of which the position and range are so determined and transmits the control signals to the respective driving mechanisms 37 of the right lamp unit 30R and the left lamp unit 30L.

The driving mechanisms 37 of the right lamp unit 30R and the left lamp unit 30L turns the right rotary shade 36 and the left rotary shade 46, respectively, in directions and through angles which are designated by the control signals to thereby block light emitted from the light sources 31 and reflected by the reflectors 33. This forms the partial high beam pattern PH having the desired non-illuminated area S ahead of the vehicle 10.

The embodiment that has been described heretofore is intended to ease the understanding of the invention but is not intended to limit the invention. It is obvious that the invention can be modified and/or improved without departing from the spirit and scope of the invention and that the resulting equivalents are included in the invention.

In the embodiment, from the viewpoint of facilitating the countermeasures against chromatic aberration, the semiconductor light emitting device is used as the light source 31, and the resin lens is used as the projection lens 34. However, a laser light source or a lamp light source (an incandescence lamp, a halogen lamp, a discharge lamp, a neon lamp, and the like) may be used as the light source 31. Additionally, a glass lens may be used as the projection lens 34.

The circumferential edge portions of the light distribution patterns which are formed by the first twisted end face 36*d*2 of the right rotary shade 36 and the first twisted end face 46*d*2 of the left rotary shade 46, that is, the positions and shapes of the right cut-off line RC and the left cut-off line LC are not limited to those described in the embodiment. As long as a twisted end face is formed which changes continuously the position of each cut-off line in association with the turning of each rotary shade, the shape of the twisted end face can be determined arbitrarily. However, the twisted end face needs to be disposed so that the twisted end face approaches the optical axis A1 of the projection lens 34 as it approaches the projection lens and so that the twisted end face moves from the front to the rear of the rear focal point F of the projection lens 34 as the corresponding rotary shade is turned in the direction in which the illumination area is increased.

The second twisted end face 36d3 of the right rotary shade 36 and the second twisted end face 46d3 of the left rotary shade 46 do not necessarily have to be formed.

This patent application is based on the Japanese Patent Application No. 2012-272244 filed on Dec. 13, 2012, and the Japanese Patent Application No. 2012-272247 filed on Dec. 13, 2012, the contents of which are incorporated herein by reference.

The invention claimed is:

1. A lamp unit comprising:
   a light source;
   a projection lens through which at least part of light emitted from the light source passes;
   a rotary shade which is disposed behind the projection lens so as to block part of light emitted from the light source and which has a turning axis; and
   a driving mechanism which turns the rotary shade around the turning axis, wherein
   the rotary shade comprises:
   a first end edge which is projected to the front of the projection lens as a circumferential edge portion of a first light distribution pattern when the driving mechanism turns the rotary shade to a first angular position;
   a second end edge which is projected to the front of the projection lens as a first circumferential edge portion of a second light distribution pattern which has a wider illumination area than that of the first light distribution pattern when the driving mechanism turns the rotary shade to a second angular position;
   a third end edge which is projected to the front of the projection lens as a first circumferential edge portion of a third light distribution pattern which has a wider illumination area than that of the second light distribution pattern when the driving mechanism turns the rotary shade to a third angular position; and
   a first twisted end face which extends around the turning axis so as to intersect the second end edge and the third end edge in different positions in relation to the direction of the turning axis, wherein
   the second angular position is positioned between the first angular position and the third angular position, wherein
   part of the first twisted end face is projected to the front of the projection lens as a second circumferential portion of the second light distribution pattern and a second circumferential edge portion of the third light distribution pattern, wherein
   the first twisted end face is disposed so as to approach an optical axis of the projection lens as it approaches the projection lens, and wherein
   the first twisted end face moves from the front to the rear of a rear focal point of the projection lens when the driving mechanism turns the rotary shade from the first angular position to the third angular position.

2. The lamp unit according to claim 1, wherein
   the rotary shade comprises a second twisted end face which extends around the turning axis so as to intersect the first twisted end face and the first end edge in different positions in relation to the direction of the turning axis.

3. The lamp unit according to claim 1, wherein
   the rotary shade comprises a circumferential surface which extends concentrically with the turning axis, and part of the first end edge, part of the second end edge and the third end edge may extend parallel to the turning axis to constitute part of the circumferential surface.

4. The lamp unit according to claim 1, wherein
   the first light distribution pattern is a light distribution pattern which illuminates further downwards than the circumferential edge portion, wherein
   the second light distribution pattern and the third light distribution pattern are light distribution patterns which illuminate further downwards than the circumferential edge portions thereof and either of the left and right of the second circumferential edge portions in an area which illuminates further upwards than the first circumferential edge portions thereof, and wherein
   the second circumferential edge portions move in the left-to-right direction when the driving mechanism turns the rotary shade from the second angular position to the third angular position.

5. The lamp unit according to claim 1, wherein
   the light source is a semiconductor light emitting device, and the projection lens is a resin lens.

* * * * *